(12) United States Patent
Xu

(10) Patent No.: US 12,373,712 B2
(45) Date of Patent: Jul. 29, 2025

(54) ARTIFICIAL INTELLIGENCE MODEL INFERENCE AND TUNING PEER-TO-PEER NETWORK SYSTEM

(71) Applicant: NVIDIA Corporation, Santa Clara, CA (US)

(72) Inventor: Bing Xu, Kirkland, WA (US)

(73) Assignee: NVIDIA Corporation, Santa Clara, CA (US)

(*) Notice: Subject to any disclaimer, the term of this patent is extended or adjusted under 35 U.S.C. 154(b) by 0 days.

(21) Appl. No.: 18/412,698

(22) Filed: Jan. 15, 2024

(65) Prior Publication Data

US 2025/0148314 A1    May 8, 2025

Related U.S. Application Data

(60) Provisional application No. 63/596,368, filed on Nov. 6, 2023, provisional application No. 63/596,363, filed on Nov. 6, 2023.

(51) Int. Cl.
    *G06N 5/04*           (2023.01)
    *G06N 20/00*        (2019.01)

(52) U.S. Cl.
    CPC ............... *G06N 5/04* (2013.01); *G06N 20/00* (2019.01)

(58) Field of Classification Search
CPC .......... G06N 20/00; G06N 5/04; G06N 10/80; G06N 5/02; G06N 5/022; G06N 7/01; G06N 20/20; G06N 3/08; G06N 3/098; G06N 3/0464; G06N 3/086; G06N 3/0985; G06N 3/126; G06N 5/01; G06N 5/043; G06N 20/10; G06N 3/02; G06N 3/04;

(Continued)

(56) References Cited

U.S. PATENT DOCUMENTS

| 10,541,938 B1 | 1/2020 | Timmerman et al. |
| 10,944,688 B2 | 3/2021 | Florissi |
| 11,755,947 B1 | 9/2023 | Hernandez Munuera et al. |

(Continued)

OTHER PUBLICATIONS

"Cohort-based federated learning services for industrial collaboration on the edge" Hiessl et al (Year: 2022).*

(Continued)

*Primary Examiner* — Luis A Sitiriche
(74) *Attorney, Agent, or Firm* — Taylor Duma L.L.P.

(57) ABSTRACT

A peer-to-peer signal node may include a communication interface in communication with a plurality of client machines via a network. The communication interface may receive a client request message identifying a designated computing model and input data on which to execute the designated computing model. The peer-to-peer signal node may also include a computation node registry maintaining access information for a plurality of distributed computation nodes accessible via the network. The peer-to-peer signal node may also include a work scheduler, which may select a distributed computation node and transmit a computation request message to the selected node identifying the designated computing model and the input data and establishing a communication session between the distributed computation node and the client machine through which the distributed computation node transmits a result obtained based on executing the computing model using the input data.

20 Claims, 14 Drawing Sheets

(58) Field of Classification Search
CPC .......... G06N 3/063; G06N 3/10; G06N 5/025; G06N 5/048; G06N 7/06
See application file for complete search history.

(56) References Cited

U.S. PATENT DOCUMENTS

| | | |
|---|---|---|
| 2011/0299682 A1 | 12/2011 | Hallenstal et al. |
| 2017/0230295 A1 | 8/2017 | Polacek |
| 2020/0287961 A1 | 9/2020 | Snider et al. |
| 2020/0334567 A1 | 10/2020 | Bhattacharjee et al. |
| 2021/0073696 A1 | 3/2021 | Gao et al. |
| 2021/0089673 A1* | 3/2021 | Takahashi .............. G06F 21/62 |
| 2021/0194715 A1 | 6/2021 | Ansari et al. |
| 2022/0029971 A1 | 1/2022 | Gharibi et al. |
| 2022/0417285 A1 | 12/2022 | Hamlin et al. |
| 2023/0082680 A1* | 3/2023 | Perumalla ............. G06F 9/5083 718/104 |
| 2025/0148349 A1 | 5/2025 | Xu |

OTHER PUBLICATIONS

Xu, Bing; Non-Final Office Action for U.S. Appl. No. 18/403,057, filed Jan. 3, 2024, mailed Apr. 25, 2024, 32 pgs.
Guo, et al.; "When Network Operation Meets Blockchain: An Artificial-Intelligence-Driven Customization Service for Trusted Virtual Resources of IoT," IEEE Network 34.5, 2020, 8 pgs.
Xu, Bing; Final Office Action for U.S. Appl. No. 18/403,057, filed Jan. 3, 2024, mailed Nov. 8, 2024, 27 pgs.
Xu, Bing; Advisory Action for U.S. Appl. No. 18/403,057, filed Jan. 3, 2024, mailed Jan. 28, 2025, 3 pgs.

* cited by examiner

ARTIFICIAL INTELLIGENCE MODEL INFERENCE AND TUNING PEER-TO-PEER NETWORK SYSTEM

CROSS-REFERENCE TO RELATED APPLICATIONS

This application claims the benefit under 35 U.S.C. § 119(e) of US Provisional Patent Application HPMLP001P by Xu, titled: "DECENTRALIZED ARTIFICIAL INTELLIGENCE COMPUTATION GATEWAY SYSTEM", filed on Nov. 6, 2023, and of US Provisional Patent Application HPMLP002P by Xu, titled: "PEER-TO-PEER ARTIFICIAL INTELLIGENCE INFERENCE NETWORK SYSTEM", filed on Nov. 6, 2023, both of which are incorporated herein by reference in their entirety for all purposes.

FIELD OF TECHNOLOGY

This patent application relates generally to peer-to-peer networks, and more specifically to distributed computation relying on peer-to-peer networks.

BACKGROUND

Artificial intelligence and machine learning computing tasks have generated increased need for computing power in recent years. In particular, model inference and tuning tasks are often highly variable in their demand for computing power, with average demand being relatively low but with peak demand far exceeding the capabilities of an individual computing device such as a mobile phone or desktop computer. Accordingly, in recent years many computing tasks have been pushed to cloud computing environments, which are better able to handle variable demand for computing resources. Cloud computing environments can be costly and difficult to configure, as well as exhibiting other drawbacks. Accordingly, improved techniques for decentralized computing are desired.

SUMMARY

Techniques and mechanisms described herein provide for devices, systems, methods, and computer readable media having instructions stored thereon for a peer-to-peer computing system. In some embodiments, a peer-to-peer signal node may include a communication interface in communication with a plurality of client machines via a network. The communication interface may receive from a client machine of the plurality of client machines a client request message identifying a designated computing model and input data on which to execute the designated computing model. The peer-to-peer signal node may also include a computation node registry maintaining access information for a plurality of distributed computation nodes accessible via the network. The computation node registry may identify a correspondence between the plurality of distributed computation nodes and a plurality of computing models available for execution at the plurality of distributed computation nodes. The peer-to-peer signal node may also include a work scheduler. The work scheduler may select from the computation node registry a distributed computation node of the plurality of distributed computation nodes based on the client request message. The designated computing model may be identified in the computation node registry as being executable at the distributed computation node. The work scheduler may also transmit one or more computation request messages to the distributed computation node identifying the designated computing model and the input data and establishing a communication session between the distributed computation node and the client machine through which the distributed computation node transmits a result obtained based on executing the computing model using the input data. The peer-to-peer signal node may also include a transaction database configured to store one or more records reflecting execution of the designated computing model on the input data by the distributed computation node based on the client request message.

In some embodiments, the result may be transmitted to the client machine without passing through the peer-to-peer signal node.

In some embodiments, establishing the communication session may involve transmitting an offer to the distributed computation node. The offer may include client machine connection information to transmit an initial P2P connection message from the distributed computation node to the client machine.

In some embodiments, establishing the communication session may involve transmitting an offer to the client machine. The offer may include distributed computing node connection information to transmit an initial P2P connection message from the client machine to the distributed computation node.

In some embodiments, the peer-to-peer signal node may include a node monitor configured to determine a dynamic latency value determined based on timing of the one or more computation request messages and transmission of the result. The distributed computation node may be deregistered from the computation node registry based at least in part upon a determination that the dynamic latency value is inconsistent with a registered latency value stored in the computation node registry.

In some implementations, the peer-to-peer signal node may include a node monitor configured to transmit a validation request identifying validation input data to the distributed computation node and to receive a validation response including a validation output value. The distributed computation node may be deregistered from computation node registry based at least in part upon a determination that the validation output value does not match a predetermined validation value determined by executing the designated computing model based on the validation input data.

In some embodiments, the communication interface exposes an application procedure interface (API) to the plurality of client machines via the network, and the client request message conforms to the API.

In some embodiments, the client machine may be an artificial intelligence (AI) computation worker of a plurality of AI computation workers in a distributed AI computation network.

In some embodiments, the designated computing model is a pretrained machine learning model or artificial intelligence model. The input data may include inference data. Executing the designated computing model may involve applying the pretrained machine learning model or artificial intelligence model to the inference data. The result may include an output value determined by applying the pretrained machine learning model or artificial intelligence model to the inference data. Alternatively, or additionally, the input data may include finetuning data, and executing the pretrained machine learning model or artificial intelligence model may involve finetuning the pretrained machine learning model or artificial intelligence model based on the finetuning data.

In some implementations, the plurality of distributed computation nodes may include a first distributed computation node controlled by a first entity and a second distributed computation node controlled by a second entity. The client machine may be controlled by a third entity, while the peer-to-peer signal node may be controlled by a fourth entity.

In some embodiments, the plurality of computing models may include a first computing model provided by a first computing model provider and a second computing model provided by a second computing model provider.

In some embodiments, the communication interface may be configured to facilitate registration of the distributed computation node with the peer-to-peer signal node. Registration may include determining and storing information such as model availability information, geographic location information, communication latency information, and/or computation cost information.

In some implementations, the plurality of distributed computation nodes may include a first distributed computing node acting as a gateway to a first artificial intelligence service located in a first cloud computing networks associated with a first cloud computing provider. The plurality of distributed computation nodes may include a second distributed computing node acting as a gateway to a second artificial intelligence service located in a second cloud computing networks associated with a second cloud computing provider.

In some embodiments, the communication interface may be configured to receive computing model information from a model storage system storing the plurality of computing models. The designated computing model is retrieved from the model storage system by the distributed computation node.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, methods, and computer program products for distributed computing. These drawings in no way limit any changes in form and detail that may be made by one skilled in the art without departing from the spirit and scope of the disclosed implementations.

DETAILED DESCRIPTION

Figure 1:
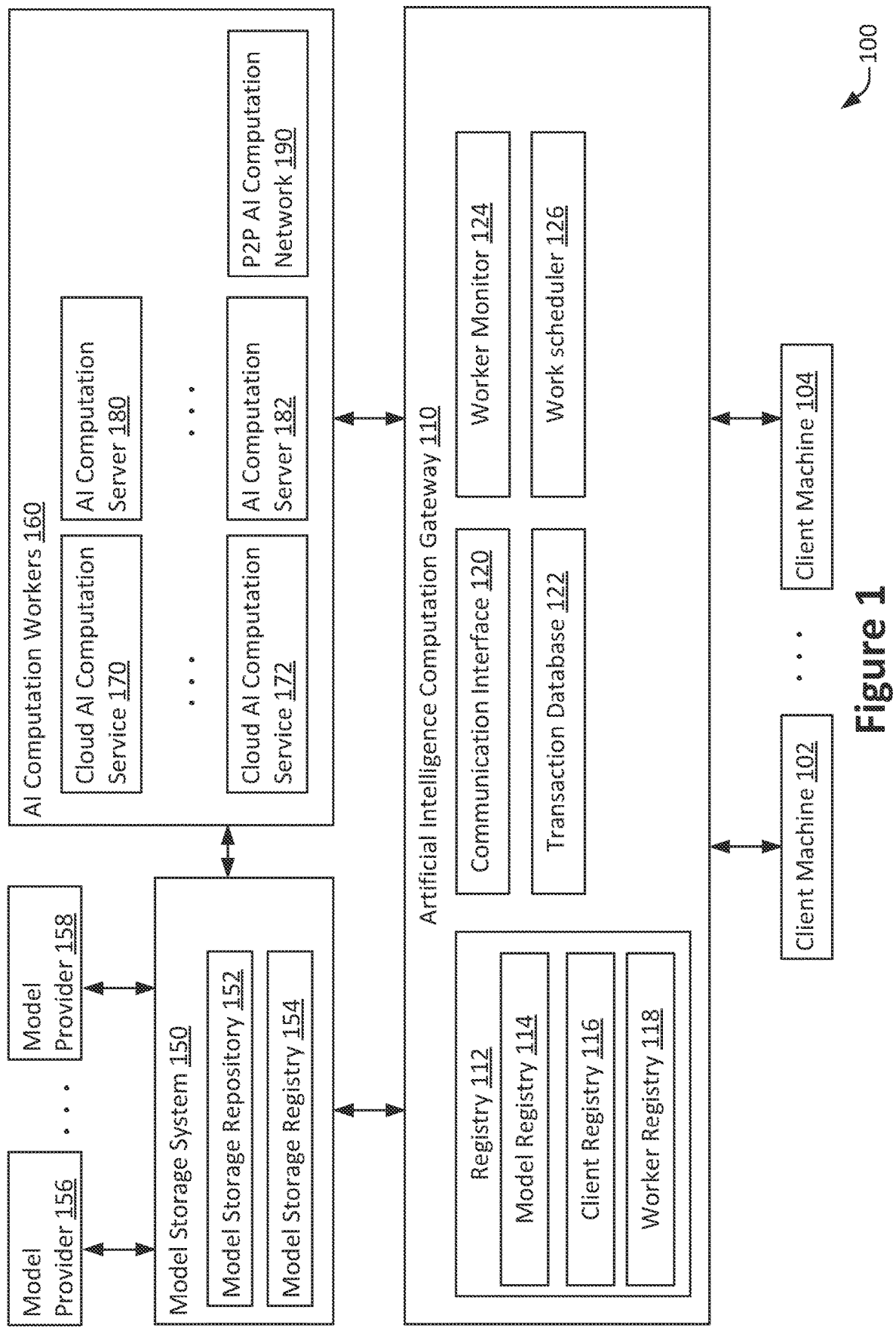
FIG. 1 illustrates a diagram of an artificial intelligence computation system, configured in accordance with one or more embodiments.

Techniques and mechanisms described herein provide for a decentralized artificial intelligence computing system. According to various embodiments, the decentralized AI computation system includes an AI computation gateway in communication with computation providers and client machines. The AI computation gateway serves as an access point for user-initiated application procedure interface (API) calls and can be implemented as a single server or as a collection of distributed nodes. The AI computation gateway allocates incoming AI computation requests received via an API to an AI computation worker system at an appropriate computation provider. This gateway can operate in a public domain or within a private enterprise network (e.g., catering to specific organizational requirements).

According to various embodiments, an AI computation request can identify any of various operations related to pre-trained artificial intelligence models. For example, an AI computation request can include a request to perform inference on input data using a pre-trained AI model. As another example, an AI computation request can include a request to fine-tune a pre-trained AI model using fine-tuning data. As used herein, the term "artificial intelligence" model refers broadly to any supervised or unsupervised computation model configured to perform operations related to artificial intelligence and/or machine learning.

In some embodiments, the decentralized AI computation system includes devices and systems configured with software applications that provide AI computation capabilities. Such applications may run on any of various computational platforms, including but not limited to smartphones, laptops, servers, and/or cloud-hosted virtual machines. Many such applications may be integrated with the decentralized AI computation system via a simple alteration of the application's API call endpoint URL, and without changes to the existing software.

In some implementations, the decentralized AI computation system includes various computation providers. Computation providers can assume any of various forms, such as one or more P2P AI computation networks, one or more AI computation servers (e.g., self-managed systems), one or more cloud computation instances, one or more standalone cloud AI computation systems, or some combination thereof. Different computation providers may be controlled by different entities, such as different cloud computing providers, different organizations, and/or different individuals.

In some embodiments, AI computation servers or cloud instances may operate as individual or grouped AI computation workers registered with the AI computation gateway. An AI computation worker may be equipped with one or more agents such as an AI work scheduler and/or an AI worker computation program. The AI computation workers may be programmed to initiate a connection to the AI computation gateway once the worker detects its online presence.

In some embodiments, an AI computation worker may serve as a conduit to a cloud AI computation service. For instance, the AI computation worker may translate user API requests into the requisite format for the cloud AI computation API. The AI computation worker may then receive and translate response messages from the cloud computation API into responses sent via the decentralized AI computation system.

In some embodiments, an AI computation worker may serve as a conduit to a peer-to-peer (P2P) AI computation network. In a P2P AI computation network, a peer acts as a potential computation provider. Upon initialization, the AI computation gateway may establish a connection to the P2P AI computation network and act as a client of that network. The AI computation gateway may spawn multiple processes to facilitate simultaneous client connections to one or more P2P AI computation networks.

According to various embodiments, the AI computation gateway is responsible for aggregating data points about AI computation workers, which include but are not limited to AI computation worker latency, cost, and priority. The AI computation gateway may also manage the scheduling and allocation of tasks to the AI computation workers. For instance, when a client machine sends an AI computation API request to the AI computation gateway, the gateway can strategically dispatch the request to any registered computation provider that meets the criteria for latency, cost, and priority defined in the request. Upon completion of the computation task, the AI computation worker transmits the computation results back to AI computation gateway, which in turn relays the results to the client machine or another destination.

According to various embodiments, techniques and mechanisms described herein provide for streamlined AI computation execution. For instance, resource utilization and performance may be improved. Various embodiments provide for a scalable and efficient alternative to traditional centralized cloud systems. Thus, the decentralized AI computation system may benefit both developers and enterprises, for instance by executing AI computation operations while reducing operational costs, reducing latency, and/or seamlessly integrating with existing software infrastructure.

Techniques and mechanisms described herein also provide for artificial intelligence computation via a peer-to-peer (P2P) network system. The P2P AI computation network system includes P2P workers, client machines, and one or more signal nodes. These components may coordinate to execute operations related to pre-trained artificial intelligence and/or machine learning computation models. The P2P AI computation network system is peer-to-peer in the sense that operations are distributed across various nodes, a single node may act as one or more of a P2P worker, a client machine, and a signal node, depending on network configuration.

In some embodiments, a decentralized artificial intelligence computing system may be deployed in conjunction with one or more P2P AI computation network systems. Alternatively, a decentralized artificial intelligence computing system may be deployed independently of any P2P AI computation network system. As yet another possibility, a P2P AI computation network system may be deployed independently of any decentralized artificial intelligence computing system. Various configurations are possible.

In some implementations, the P2P AI computation network system receives AI computation requests from client machines. A client machine includes both the device and software that initiate AI computation requests. A client machine supplies or identifies the input data to the AI model and requests the corresponding output. The client machine may perform partial computation of the AI model. Similar to P2P worker nodes, client machines may be numerous and geographically diverse, with client machines maintaining network connectivity when requesting AI computation and receiving the results. In some configurations, a device may be configured as both a client machine and a P2P worker node.

In some implementations, the P2P AI computation network system includes signal nodes, which are servers that facilitate the establishment of P2P connections between P2P worker nodes and client machines and facilitate the maintenance of records of AI computation transactions. The system may include a single signal node or a network of distributed servers each acting as signal nodes. Transaction records may be stored in one or more database systems and/or blockchain systems. Sample inputs and expected outputs for AI models can be stored in the signal nodes or in other servers connected to signal nodes.

In some embodiments, when a client machine receives a request for AI computation, it transmits a request message to a signal node. The signal node then identifies and selects an available P2P worker node (e.g., the nearest available worker) that meets the criteria specified in the request. Such criteria may include, for instance, acceptable computation latency. The request may then be forwarded to the selected P2P worker node.

According to various embodiments, a P2P worker node is a computational device equipped with AI computation software and one or more AI models. Upon receiving input data, the P2P worker node executes an AI model in accordance with the request using the AI computation software to produce an output. Depending on the configuration of the network, P2P worker nodes may encompass a variety of computational devices capable of performing AI computations, such as personal computers, servers, cloud instances, workstations, gaming consoles, autonomous vehicles, and smartphones. The P2P worker network may be expansive, including numerous devices with varying AI computation capabilities and geographical locations connected to the network.

In some embodiments, a P2P worker node may implement one or more software applications that provide AI computation capabilities. Such applications may run on any of various computational platforms, including but not limited to smartphones, laptops, servers, and/or cloud-hosted virtual machines. Many such applications may be integrated with the decentralized AI computation system via a simple alteration of the application's API call endpoint URL, and without changes to the existing software.

In some embodiments, the client machine may establish a P2P connection with the P2P worker node while the P2P worker node is processing the AI computation. Upon completion, the P2P worker node may then transmit the results to the client machine via the P2P connection. Alternatively, the P2P worker node may send an offer to the signal node upon completing the computation. The signal node may then relay the offer to the P2P worker node. Then, the client machine and P2P worker node can establish a P2P connection through which the results may be delivered to the client machine.

In some embodiments, within the P2P AI computation system, a P2P worker node must authenticate its capability to function effectively. Such authentication may be accomplished by validating the AI model and ensuring it has not been altered prior to loading it into the software. Upon collecting diagnostic data, the P2P worker node can submit a registration request to a signal node. The registration request can include the self-diagnostic data, hardware specifications, geographical information, and details involved in establishing a P2P connection to the P2P worker node.

In some embodiments, the signal node may validate the P2P worker node's registration request against reference data and may optionally initiate a test inference to further ensure the P2P worker node's reliability. For example, the P2P worker node may conduct an AI computation operation using predefined input data, with the result being compared with expected outputs by the signal node. The processing latency may also be measured. Once all checks are satisfied, the P2P worker node may be registered within the P2P AI computation system.

According to various embodiments, techniques and mechanisms described herein capitalize on the distributed nature of computational resources to improve the efficiency of AI computation tasks, rendering the process more efficient and cost-effective for participants within the network. The P2P AI computation network system may benefit both developers and enterprises, for instance by executing AI computation operations while reducing operational costs, reducing latency, and/or seamlessly integrating with existing software infrastructure.

FIG. 1 illustrates a diagram of an artificial intelligence computation system 100, configured in accordance with one or more embodiments. The artificial intelligence computation system 100 may be used to execute artificial intelligence model computation requests from various client machines on any of various predetermined AI models implemented on any of various AI computation workers.

The AI computation system 100 includes client machines 102 through 104 in communication with an artificial intelligence computation gateway 110. The artificial intelligence computation gateway 110 is in communication with AI computation workers 160 as well as a model storage system 150.

According to various embodiments, the AI computation workers 160 may include various numbers and/or types of computing systems and devices accessible via a network and capable of executing one or more AI models to perform AI computation tasks. For example, the AI computation workers 160 shown in FIG. 1 include some number of cloud AI services such as the cloud AI service 170 through the cloud AI service 172. As another example, the AI computation workers 160 shown in FIG. 1 include some number of AI computation servers such as the AI computation server 180 through the AI computation server 182. As yet another example, the AI computation workers 160 shown in FIG. 1 include a P2P AI computation network 190. Although a single AI computation network 190 is shown in FIG. 1, the system may include more than one such network.

According to various embodiments, an AI computation worker 160 may be configured to execute a predetermined and pre-trained model against inference data to produce and return an outcome. For instance, an AI computation worker 160 may perform operations such as registering to the artificial intelligence computation gateway 110, downloading one or more models from the model storage system 150, receiving a request to execute a downloaded model on inference data, and communicating the result of the inference for transmission to a client machine.

In some embodiments, an AI computation worker 160 may be configured to fine-tune a predetermined and pre-trained model using fine-tuning data to produce a fine-tuned model. Finetuning may involve performing additional training on a pre-trained model using small amounts of labeled data to return model weights (or low-rank matrix representations of the changes to the model weights). The fine-tuned model may include one or more tuning layers used to refine input to the model and/or output received from the model. A tuning layer may be returned to a client machine or stored to a model storage system, depending on the network configuration and/or the nature of the request.

In some embodiments, a cloud AI computation service 170 is a third-party cloud computing service configured to execute a trained AI model on data to determine an outcome. For example, a cloud AI computation service may be Amazon Elastic Inference, Amazon Sagemaker, Google Dataflow, Google BigQuery ML, Microsoft's Deep Learning Inference Service, or any other network-accessible on-demand computing system providing AI computation as a service.

In some embodiments, an AI computation server 180 is a privately managed computing system configured to perform AI computation operations on demand. For example, an AI computation server 180 may be owned by the same organization associated with a computation request from a client machine. As another example, an AI computation server 180 may be any privately managed computing system registered to the artificial intelligence computation gateway 110.

According to various embodiments, the P2P AI computation network 190 may be a distributed network of workers configured to perform AI computation tasks upon request. For instance, the P2P AI computation network may include some number of signal nodes and/or workers that coordinate in various ways to execute AI computation tasks. Additional details regarding P2P AI computation networks are discussed throughout the application, for instance with respect to FIG. 9 through FIG. 13.

According to various embodiments, the client machines 102 through 104 may include various numbers and types of computing devices. For instance, a client machine may be a mobile phone, a desktop computer, a tablet computer, a laptop computer, an embedded computing device, or any other type of computer.

In some configurations, a computing device may be configured as more than one element shown in FIG. 1. For instance, a single computing device may be configured as two or more of a client machine, an artificial intelligence gateway, a model provider, a model storage system element, and an AI computation worker.

According to various embodiments, the artificial intelligence computation gateway 110 includes a registry 112, a communication interface 120, a transaction database 122, a worker monitor 124, and an work scheduler 126, as well as potentially other components not shown in FIG. 1. The communication interface 120 is configured to facilitate communication with the client machines 102 through 104, the AI computation workers 160, and the model storage system 150.

In some embodiments, the registry 112 maintains information such as a client registry 116, a worker registry 118, and a model registry 114. Such information may be maintained in one or more database tables.

In some embodiments, the client registry 116 stores information about clients registered with the artificial intelligence computation gateway 110. For instance, the client registry 116 may store information such as an IP address, a geographic location, a geographic region, a registration timestamp, and/or other such information about a client machine 102.

In some implementations, the worker registry 118 stores information about AI computation workers 160 registered with the artificial intelligence computation gateway 110. For instance, the worker registry 118 may store information such as a geographic location, a geographic region, computing capabilities, available models, and/or other such information about a AI computation worker 160.

In some embodiments, the model registry 114 may store information about models available via the artificial intelligence computation gateway 110. For instance, the model registry 114 may store information about models stored in the model storage system 150.

In some embodiments, the transaction database 122 may store information about computation transactions and/or other types of transactions associated with the artificial intelligence computation gateway 110. For instance, the transaction database 122 may store information characterizing an computation request from a client machine. Such information may include, but is not limited to, a timestamp information, the model requested, one or more AI workers tasked with executing the computation request, latency associated with the computation request, and the like. Such information may be used, for instance, for evaluating the performance of AI computation workers.

In some implementations, the worker monitor 124 may monitor worker performance. For instance, the worker monitor 124 may communicate with workers via the communication interface 120 to perform tasks such as registering workers to the artificial intelligence computation gateway 110, assigning test inference tasks to workers, evaluating worker performance and/or accuracy, and/or updating the worker registry 118 based on information determined about workers.

In some embodiments, the work scheduler 126 may be configured to facilitate the processing of computation requests. For instance, the work scheduler 126 may receive a computation request from a client machine via the communication interface 120, select one or more of the AI computation workers 160 to complete the task, communicate with the selected AI computation workers to provide instructions to complete the task, and/or process a result provided by the selected AI computation workers once the task is completed.

In some embodiments, the artificial intelligence computation gateway 110 may be implemented as one or more nodes in a distributed system. Although the artificial intelligence computation gateway 110 is shown in FIG. 1 as a single system for the purpose of exposition, in practice the system 100 may include multiple artificial intelligence computation gateways operating in unison to provide scalability in managing workers and handling computation requests.

According to various embodiments, the model storage system 150 is configured to register and store models for execution on the AI computation workers 160. Models may be provided by the model providers 156 through 158. As used herein, the term "model" refers to a predetermined AI and/or ML model capable of being executed on inference data to produce an inference result. For example, a model may be a pretrained generative AI model such as Chat GPT, Stable Diffusion, or the like. As another example, a model may be a pretrained predictive model such as a deep learning model, a random forest model, or the like. As yet another example, a model may be an unsupervised model such as a clustering algorithm.

In some embodiments, an AI computation worker can execute a finetuned and pretrained model. Finetuning may involve performing additional training on a pre-trained model using small amounts of labeled data to return model weights (or low-rank matrix representations of the changes to the model weights). Such information may then be provided to the AI computation worker and/or client machine for use in inference.

According to various embodiments, the model storage system 150 may receive a model from a model provider. The model may be stored in the model storage repository 152 and registered in the model storage registry 154. Models may then be retrieved by AI computation workers 160 for execution.

According to various embodiments, the model storage registry 154 may be implemented as a centralized or distributed database that includes data entries corresponding with the models. A data entry may identify information about a model such as the model name, model type, model version, model inputs, model output, model source, model training date, model storage system input date, model storage information, and/or any other suitable information.

According to various embodiments, the model storage repository 152 may be implemented as a centralized or distributed storage system in which models may be stored. For example, the model storage repository 152 may be implemented in one or more peer-to-peer networks, cloud storage systems, local storage devices, or some combination thereof.

In some embodiments, the system 100 need not necessarily include a model storage system 150 and model providers 156. For instance, the clients may provide models to execute on the workers instead of, or in addition to, a model storage system 150.

Figure 2:
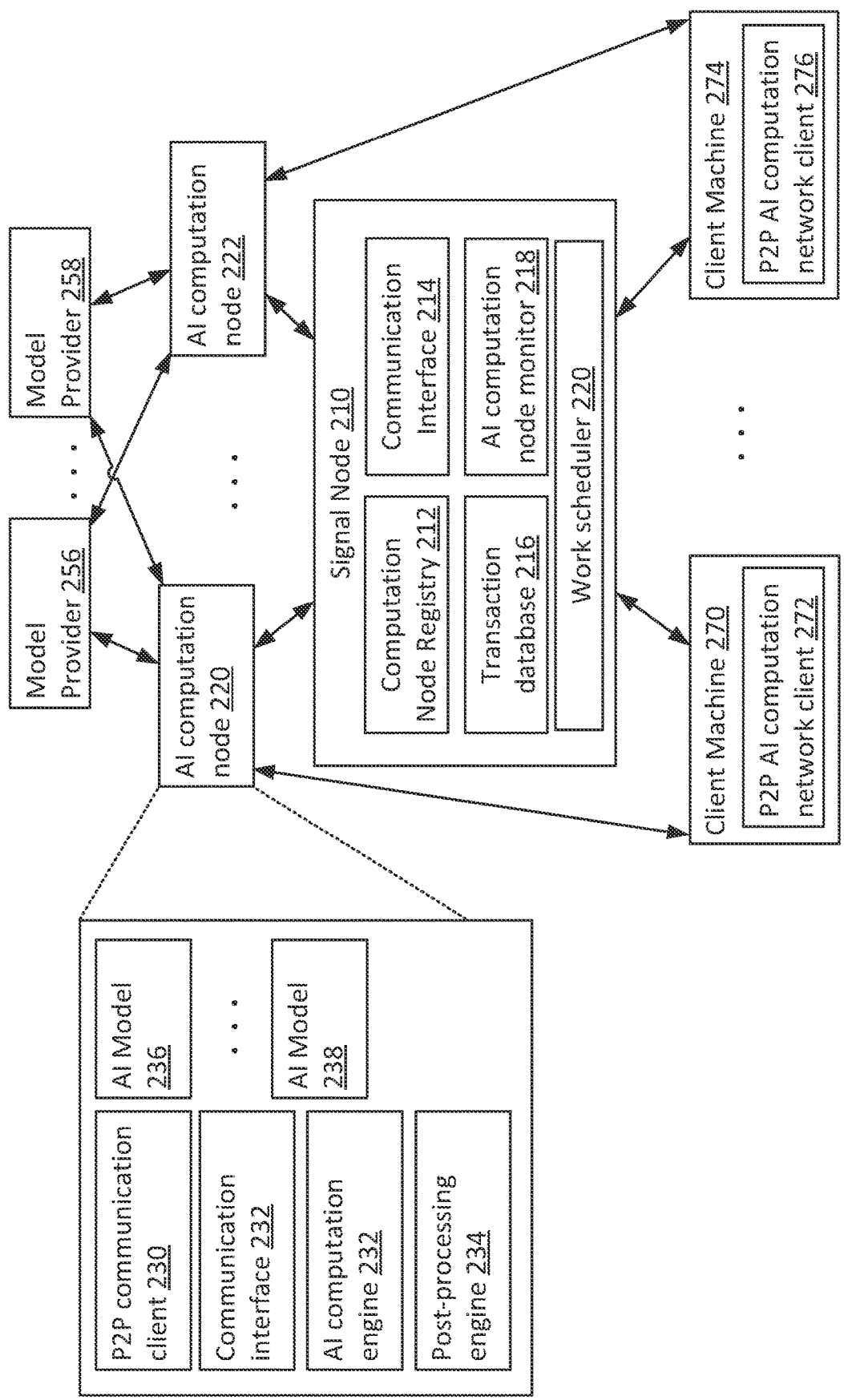
FIG. 2 illustrates a diagram of a peer-to-peer (P2P) artificial intelligence computation network system, configured in accordance with one or more embodiments.

FIG. 2 illustrates a diagram of a peer-to-peer (P2P) artificial intelligence computation network system 190, configured in accordance with one or more embodiments. The P2P artificial intelligence computation network system 190 may be used to execute artificial intelligence model computation requests from various client machines on any of various models implemented on any of various P2P worker nodes, which are also referred to herein as P2P computation nodes.

The P2P artificial intelligence computation network system 190 includes the client machines 270 through 274 in communication with a signal node 210. The signal node 210 is in communication with the P2P computation nodes 220 through 222.

According to various embodiments, the P2P computation nodes may include various numbers and/or types of computing systems and devices accessible via a network and capable of executing one or more AI models to perform AI computation tasks. For example, the P2P computation nodes may include one or more desktop computers, smart phones, laptop computers, cloud computing systems, autonomous vehicles, and/or other devices.

According to various embodiments, a P2P computation node 220 may be configured to execute a predetermined and pre-trained model against input data to produce and return an outcome. For instance, a P2P computation node 220 may perform operations such as registering to the signal node 210, downloading one or more models, receiving a request to execute a downloaded model on input data or fine-tune a downloaded model using fine-tuning data, and communicating the result of the computation for transmission to a client machine.

According to various embodiments, the client machines 270 through 274 may include various numbers and types of computing devices. For instance, a client machine may be a mobile phone, a desktop computer, a tablet computer, a laptop computer, an embedded computing device, or any other type of computer. A client machine may be equipped with a P2P AI computation network client, such as the clients 272 through 276, to facilitate communication via the P2P AI network system 190.

In some configurations, a computing device may be configured as more than one element shown in FIG. 2. For instance, a single computing device may be configured as two or more of a client machine, a signal node, and a P2P computation node.

According to various embodiments, the signal node 210 includes a P2P worker node registry 212, a communication interface 214, a transaction database 216, a P2P computation node monitor 216, and a work scheduler 220, as well as potentially other components not shown in FIG. 2. The communication interface 214 is configured to facilitate communication with the client machines 270 through 274 and the P2P computation nodes 220 through 222.

In some implementations, the P2P worker node registry 212 stores information about P2P computation nodes registered with the signal node 210. For instance, the P2P worker node registry 212 may store information such as a geographic location, a geographic region, computing capabilities, available models, and/or other such information about a P2P computation node.

In some embodiments, the transaction database 216 may store information about computation transactions and/or other types of transactions associated with the signal node 210. For instance, the transaction database may store information characterizing a computation request from a client machine. Such information may include, but is not limited to, a timestamp information, the model requested, one or more P2P computation nodes tasked with executing the computation request, latency associated with the computation request, and the like. Such information may be used, for instance, for evaluating the performance of P2P computation nodes.

In some implementations, the P2P computation node monitor 218 may monitor worker performance. For instance, the P2P computation node monitor 218 may communicate with P2P worker nodes via the communication interface 214 to perform tasks such as registering P2P worker nodes to the signal node 210, assigning test inference tasks to P2P worker nodes, evaluating P2P worker node performance and/or accuracy, and/or updating the P2P worker node registry 212 based on information determined about P2P worker nodes.

In some embodiments, the work scheduler 220 may be configured to facilitate the processing of computation requests. For instance, the work scheduler 220 may receive a computation request from a client machine via the communication interface 220, select one or more of the P2P computation nodes to complete the task, communicate with the selected P2P computation node to provide instructions to complete the task, and/or process a result provided by the selected AI computation workers once the task is completed.

In some embodiments, the signal node 210 may be implemented as one or more nodes in a distributed system. Although the signal node 210 is shown in FIG. 2 as a single system for the purpose of exposition, in practice the system 190 may include multiple signal nodes operating in unison to provide scalability in managing P2P computation nodes and handling computation requests.

According to various embodiments, the model storage system 250 is configured to register and store models for execution on the P2P computation nodes 260. Models may be provided by the model providers 256 through 258. In some configurations, the model providers 256 through 258 may be similar or identical to the model providers 156 through 158 shown in FIG. 1.

In some embodiments, one or more AI computation nodes may receive a model directly from the model providers. Alternatively, or additionally, an AI computation node mode may receive a model from a model storage system such as the model storage system 150 shown in FIG. 1.

As used herein, the term "model" refers to a predetermined and pretrained AI and/or ML model capable of being executed on inference data to produce an inference result. For example, a model may be a pretrained generative AI model such as Chat GPT, Stable Diffusion, or the like. As another example, a model may be a pretrained predictive model such as a deep learning model, a random forest model, or the like. As yet another example, a model may be an unsupervised model such as a clustering algorithm.

According to various embodiments, a P2P computation node may include a P2P communication client 230 to facilitate communication with other elements of the P2P communication network system 190 via the communication interface 232. The P2P computation nodes may also include an AI computation engine 232 configured to execute an AI/ML model on inference data upon request. Alternatively, or additionally, the AI computation engine 232 may perform other operations upon request, such as model fine-tuning.

In some embodiments, a P2P computation node can fine-tune a pretrained model. Finetuning may involve performing additional training on a pre-trained model using small amounts of labeled data to return model weights (or low-rank matrix representations of the changes to the model weights). Such information may then be provided to the AI computation node and/or client machine for use in inference.

In some embodiments, the P2P computation node may include a post-processing engine 234. The post-processing engine 234 may be configured to facilitate the transmission to a client machine of a result produced by executing an AI model on input data.

Figure 3:
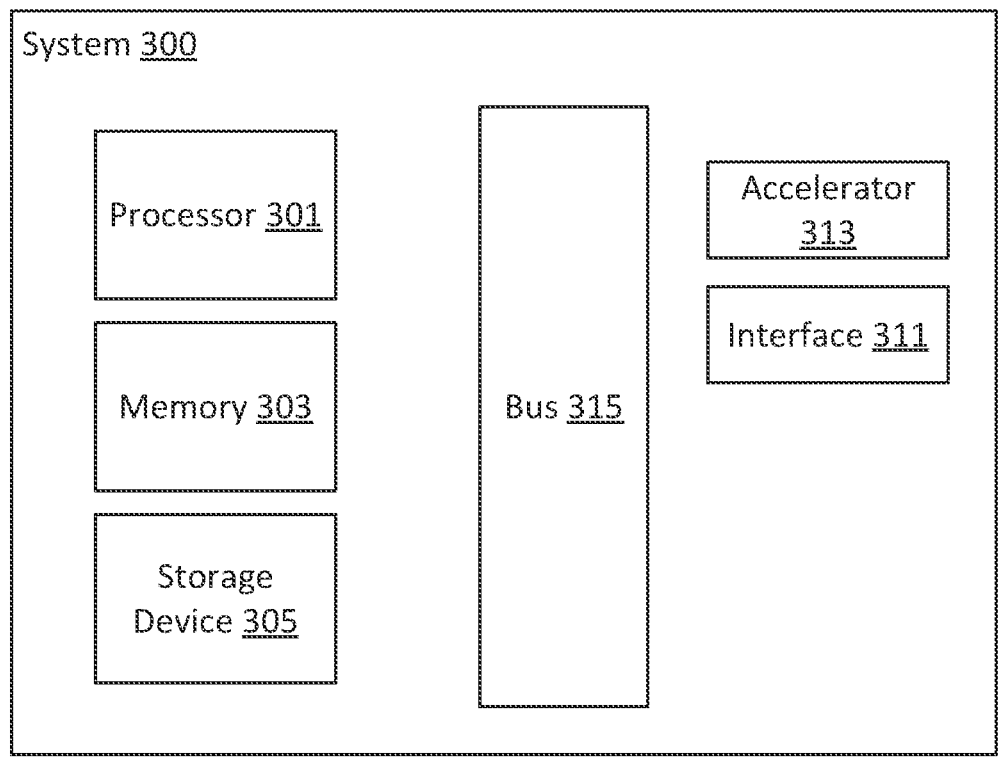
FIG. 3 illustrates one example of a computing device, configured in accordance with one or more embodiments.

FIG. 3 illustrates one example of a computing device, configured in accordance with one or more embodiments. A system 300 suitable for implementing embodiments described herein includes a processor 301, a memory module 303, a storage device 305, an interface 311, an accelerator 313, and a bus 315 (e.g., a PCI bus or other interconnection fabric.) System 300 may operate as variety of devices such as an AI computation worker, a client machine, some element of an artificial intelligence computation gateway 110, some element of the P2P AI computation Network 190, a model provider, and/or as some element of a model storage system 150, or any other device or service described herein. Although a particular configuration is described, a variety of alternative configurations are possible. The processor 301 may perform operations such as those described herein. Instructions for performing such operations may be embodied in the memory 303, on one or more non-transitory computer readable media, or on some other storage device. Various specially configured devices can also be used in place of or in addition to the processor 301. The accelerator 313 includes one or more graphics processing units (GPUs) and/or other types of processors and/or AI accelerators specially adapted for performing AI computation. Such components may be connected via PCI-E and/or other connection technology (e.g., a direct connection to the CPU). The interface 311 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 4:
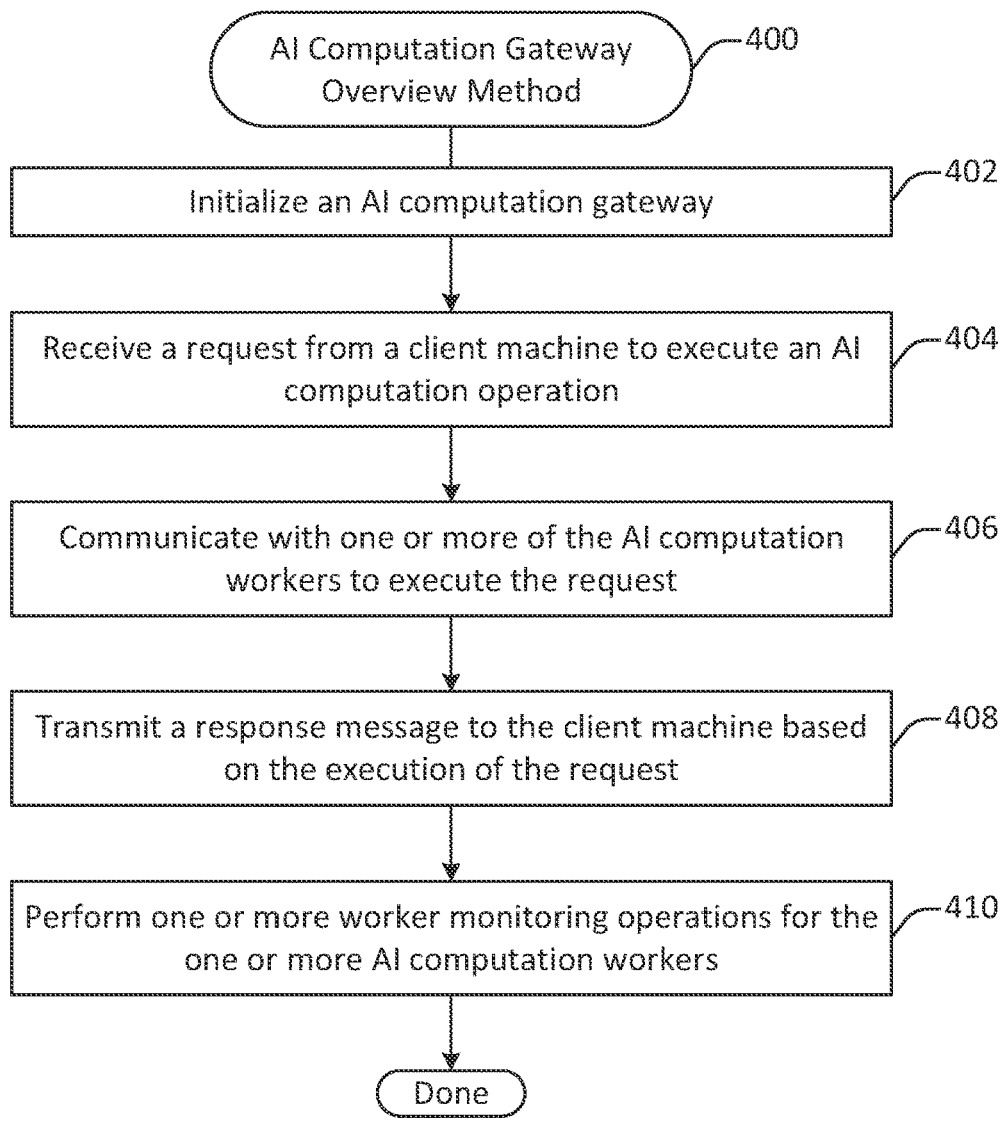
FIG. 4 illustrates an overview method for operating an artificial intelligence computation system, performed in accordance with one or more embodiments.

FIG. 4 illustrates an overview method 400 for operating an artificial intelligence computation system, performed in accordance with one or more embodiments. According to various embodiments, the method 400 may be performed at the artificial intelligence computation gateway 110 shown in FIG. 1.

An AI computation gateway is initialized at 402. In some embodiments, initializing the AI computation gateway may involve operations such as establishing connections to cloud inference services, computation servers, and/or P2P AI inference networks. In addition, an API for communicating with client machines may be exposed via a communication interface. Additional details regarding AI computation gateway initialization are discussed with respect to the method 500 shown in FIG. 5. Further details regarding the registration of AI computation workers are discussed with respect to the method 600 shown in FIG. 7.

A request to execute an AI computation operation is received from a client machine at 404. In some embodiments, the request may identify a model and inference data on which to execute the model. Alternatively, the request may identify a model and fine-tuning data on which to fine-tune the model.

At 408, the AI computation gateway communicates with one or more of the AI computation workers to execute the request. Executing the request may involve operations such as identifying one or more criteria for selecting the AI computation workers, selecting one or more AI computation workers based on the criteria, and transmitting one or more instructions to the selected AI computation worker or workers to execute the request.

At 410, a response message is transmitted to the client machine based on the execution of the request. Additional details regarding receiving, executing, and responding to a request to perform AI computation are discussed with respect to the method 700 shown in FIG. 7.

One or more worker monitoring operations are performed for the one or more AI computation workers at 412. Monitoring workers may involve ensuring that workers are accurately executing unmodified models and returning trustworthy results. Alternatively, or additionally, monitoring operations may involve evaluating metrics such as latency to ensure that workers are operating efficiently. Additional details regarding worker monitoring operations are discussed with respect to the method 800 shown in FIG. 8.

Figure 5:
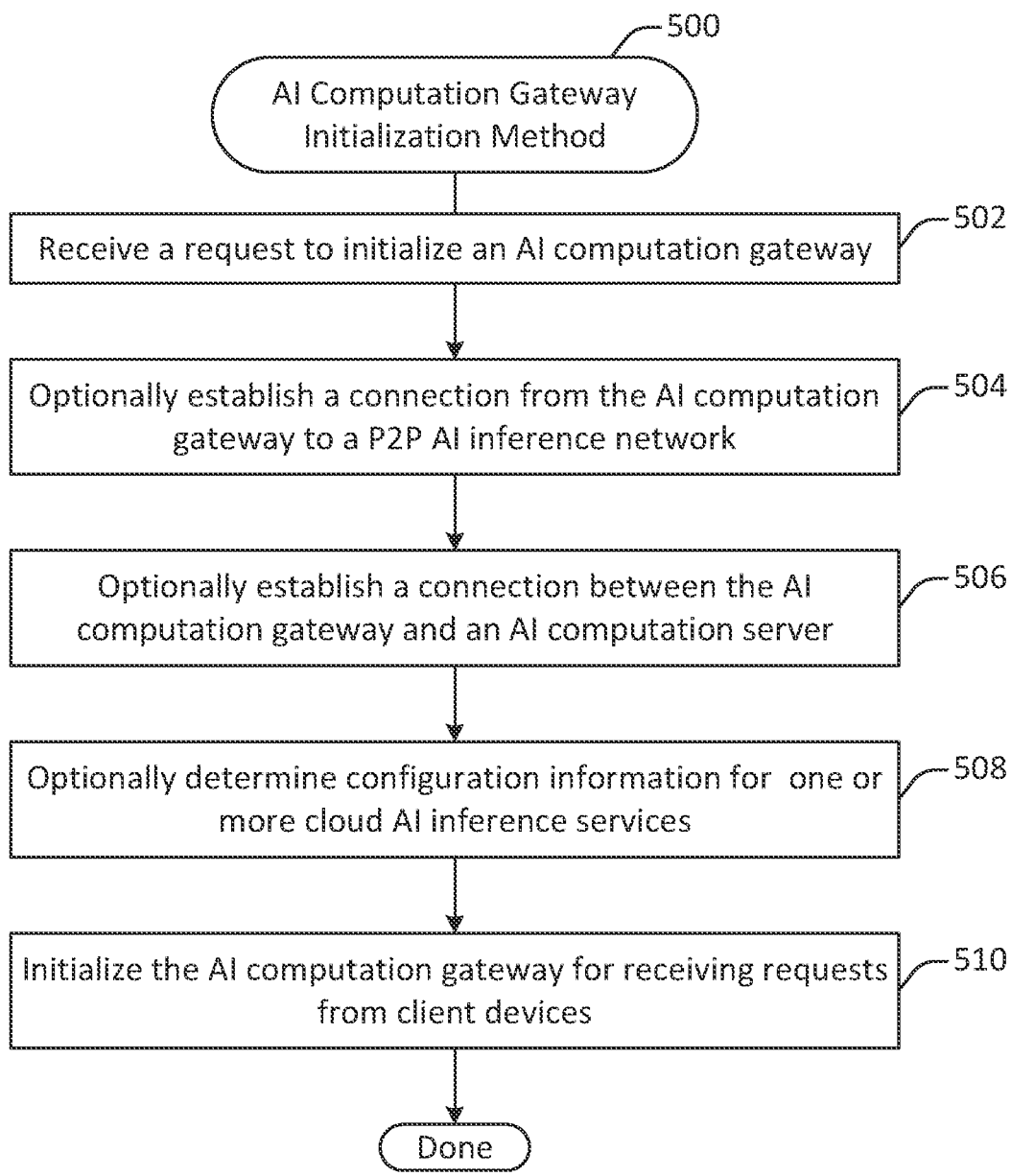
FIG. 5 illustrates a method for initializing an AI computation gateway, performed in accordance with one or more embodiments.

FIG. 5 illustrates a method 500 for initializing an AI computation gateway, performed in accordance with one or more embodiments. The method 500 may be performed at any suitable computing device, such as the artificial intelligence computation gateway 110 shown in FIG. 1.

A request to initialize an AI computation gateway is received at 502. In some embodiments, the request may be generated based on any of a variety of triggering conditions. For instance, an automated script, a request from a remote device, user input, or some other condition may trigger the initialization of the AI computation gateway.

A connection from the AI computation gateway 110 to a P2P AI computation network is optionally established at 504. In some embodiments, establishing the connection may involve, for instance, executing a handshake process between the artificial intelligence computation gateway 110 and a signal node in the AI computation network 190. The process may establish the artificial intelligence computation gateway 110 as a client of the P2P AI computation network 190. Once established as a client, the artificial intelligence computation gateway 110 may communicate with the P2P AI computation network 190 to execute computation requests on worker nodes operating with the P2P AI computation network 190.

A connection from the artificial intelligence computation gateway 110 and one or more AI computation servers is optionally established at 506. In some embodiments, establishing a connection to an AI computation server 180 may involve operations such as storing information about the AI computation server 180 in the worker registry 118, establishing a secure communication session with the AI computation server 180, and the like.

Configuration information for one or more cloud inference services is optionally determined at 508. In some embodiments, the configuration information may include connection and communication information such as one or more IP addresses, APIs, and the like. Alternatively, or additionally, the configuration information may include information about a cloud inference service, such as models accessible via the cloud inference service. Such information may be stored in the worker registry 118.

At 510, the artificial intelligence computation gateway 110 is initialized for receiving requests from client devices. Once initialized, the artificial intelligence computation gateway 110 may expose an API via which it can receive and process computation requests through the communication interface 120 shown in FIG. 1.

Figure 6:
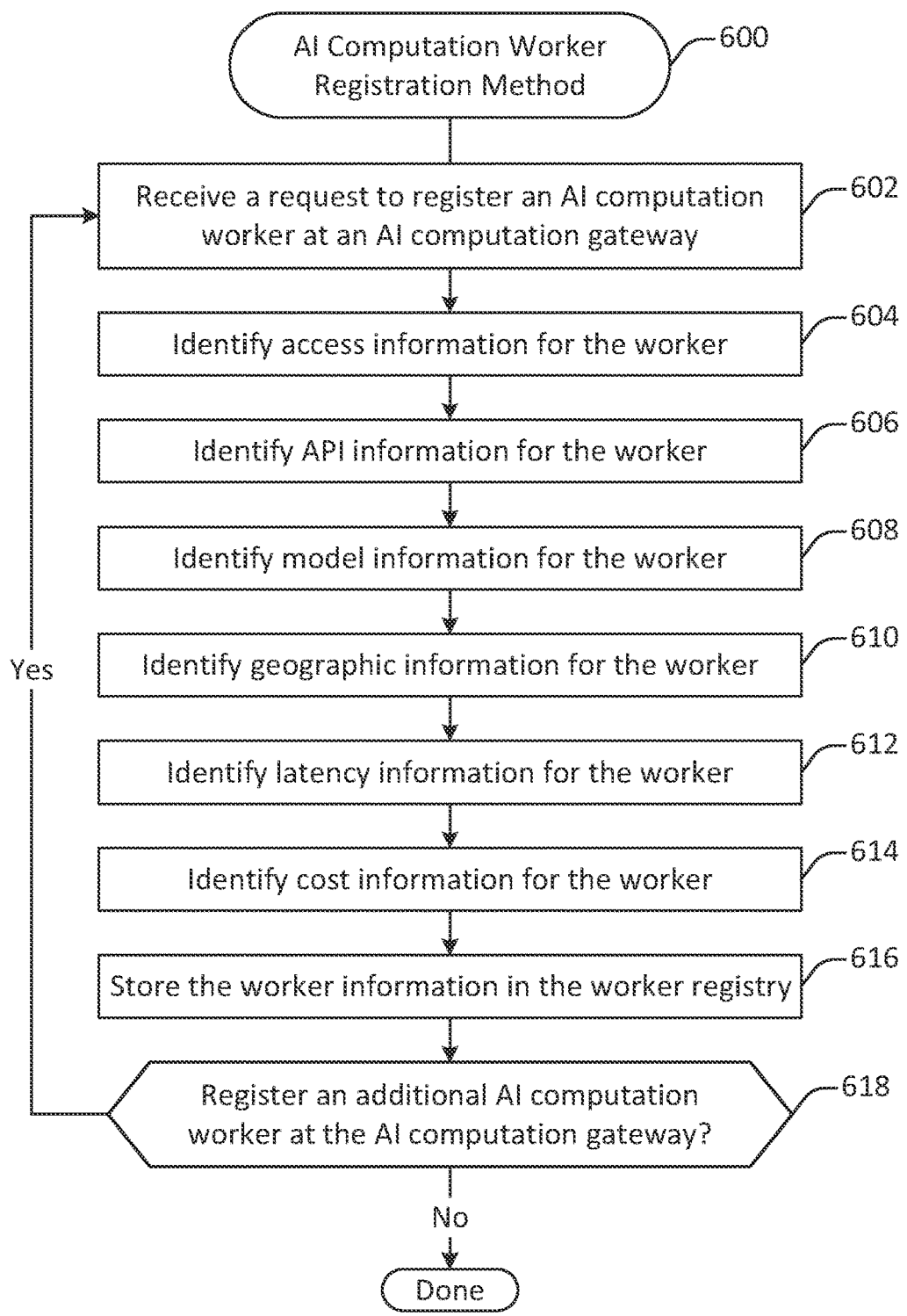
FIG. 6 illustrates a method for registering a worker at an AI computation gateway, performed in accordance with one or more embodiments.

FIG. 6 illustrates a method 600 for registering a worker at an AI computation gateway, performed in accordance with one or more embodiments. It may be executed at the artificial intelligence computation gateway 110 shown in FIG. 1.

At 602, a request to register an AI computation worker is received. In some embodiments, the request may be generated when the artificial intelligence computation gateway 110 is initialized. That is, the method 600 provides a more detailed view of some of the operations discussed with respect to the method 500 shown in FIG. 5. Alternatively, or additionally, such a request may be generated later, for instance when an administrator requests to add a new worker to the system.

At 604, access information for the AI computation worker is identified. In some embodiments, the access information may include, for instance, an IP address at which the AI computation worker can be accessed.

At 606, API information for the work is identified. In some implementations, the API information may include information for structuring requests to the AI computation worker and/or receiving responses from the AI computation worker.

At 608, model information associated with the AI computation worker is identified. In some embodiments, the model information may identify one or more models accessible via the AI computation worker.

At 610, geographic information associated with the AI computation worker is identified. In some embodiments, the geographic information may identify a geographic location and/or geographic region at which the AI computation worker is located.

At 612, latency information associated with the AI computation worker is identified. In some embodiments, the latency information may identify anticipated completion time information associated with the execution of AI computation requests sent to the AI computation worker. For instance, the latency information may identify an expected period of time after receiving a request before the AI computation worker responds to the request.

At 614, cost information associated with the AI computation worker is identified. In some embodiments, the cost information may identify an anticipated cost associated with execution of an AI computation request by the worker. For instance, the cost information may identify a cost associated with executing an inference request for a particular model.

In some embodiments, the information discussed with respect to FIG. 6 may be identified in any of various ways. For example, a worker may be associated with standard connection information, for instance accessible via an API call. As another example, some or all of the worker information may be provided as input along with the request received at 602. In some embodiments, some or all of the worker information may be provided by user input, for instance by a systems administrator. As still another example, some or all of the worker information may be retrieved from a configuration file, a database table, or some other information source.

At 616, worker information is stored in the worker registry 118. In some embodiments, the worker information may include any or all of the information discussed with respect to FIG. 6, as well as any additional information that might be relevant.

At 618, a determination is made as to whether to register an additional AI computation worker with the system. According to various embodiments, additional AI computation workers may continue to be added until all AI computation workers identified for addition have been added. In some configurations, one or more of the operations shown in FIG. 6 may be performed in an order different from that shown, in sequence or in parallel.

In particular embodiments, worker information for an AI computation worker may include a range of values for information. For example, a P2P AI computation network may have nodes operating in a variety of areas and with various models installed. As another example, latency information may include various values, such as a mean, minimum, maximum, and/or standard deviation for latency.

Figure 7:
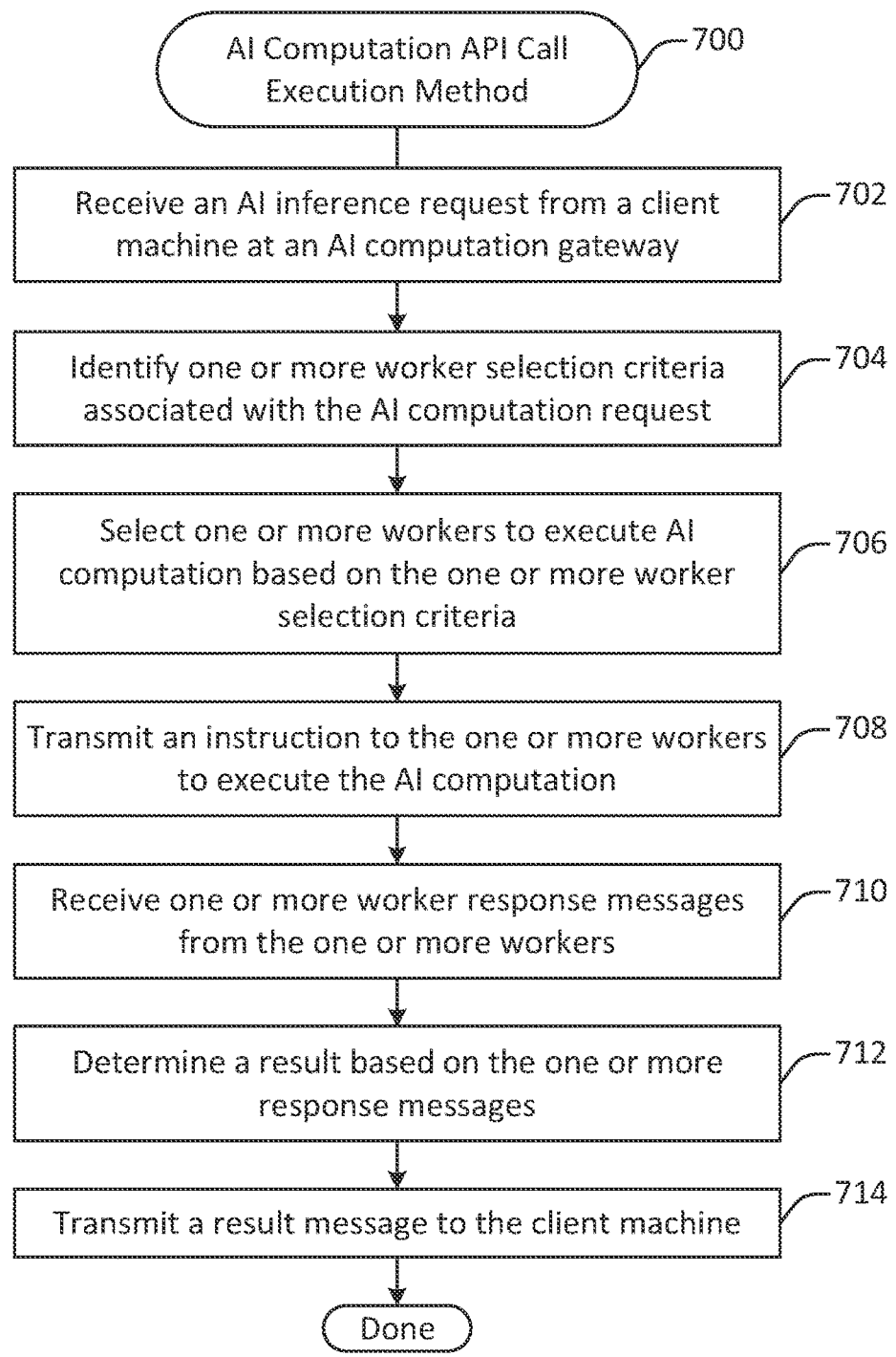
FIG. 7 illustrates an AI computation API call execution method, performed in accordance with one or more embodiments.

FIG. 7 illustrates an AI computation API call execution method 700, performed in accordance with one or more embodiments. In some embodiments, the method 700 may be performed at the artificial intelligence computation gateway 110 shown in FIG. 1.

At 702, an AI computation request is received from a client machine at an AI computation gateway. In some embodiments, the request may identify information such as data on which to execute a model, a model to execute, information about an acceptable execution cost, and information about an acceptable latency for the execution.

An example of an AI computation request is as follows. In the following request, the API gateway is contacted with an API token and information specifying a model to employ, in this case an image generation model (i.e., "SDXL" version 1.0). The API request also specifies an output image to generate and data used to generate the result (i.e., a height, width, and prompt for generating the image).

```
curl https://apigateway.hippoml.com \
-H 'Content-Type: application/json' \
-H "Authorization: Bearer $API_TOKEN" \
-d '{ "width": 1024, \
    "height": 1024, \
    "prompt": "Astronaut on Mars", \
    "model": "SDXL", \
    "model_version" : "1.0", } \
-o output_image.png
```

In some embodiments, the AI computation request may be a request to perform inference using a pretrained model based on inference data. Alternatively, the AI computation request may be a request to fine-tune a pretrained model using tuning data.

One or more worker selection criteria associated with the AI computation request are identified at 704. In some embodiments, one or more worker selection criteria may be explicitly specified in the AI computation request received from the client machine. Alternatively, or additionally, one or more worker selection criteria may be determined automatically, for instance based on geographic information associated with the client machine.

According to various embodiments, the worker selection criteria may include any information suitable for use in selecting a worker. Such information may include, but is not limited to: latency information, cost information, geographic information, and model to execute.

One or more workers to execute AI computation are selected at 706 based on the one or more worker selection criteria. According to various embodiments, the one or more workers may be selected by comparing the criteria identified at 704 against information stored in the worker registry. For example, the request may be received from a client machine located in a particular geographic region, where the request identifies information such as a model to execute, a desired maximum latency, and/or a desired maximum cost. The system may then select, for instance, a geographically proximate worker capable of executing the model (e.g., by virtue of it being installed or installable) at the desired latency and/or cost.

In some embodiments, a single worker may be selected. Alternatively, more than one worker may be selected. For example, multiple workers may be selected to execute the same request, for instance for redundancy. As another example, a request may be split into multiple requests for parallelism. As yet another example, a request may be broken down into smaller pieces to facilitate chaining. For instance, a first request may generate natural language for inclusion in a prompt, and a second request may generate an image based on the prompt.

At 708, an instruction is transmitted to the selected one or more workers to execute the AI computation. The instruction may identify the model to execute and the data to provide as input to the model. The instruction may additionally identify information such as a seed to provide to the model, for the purpose of reproducibility. The data may be included with the request or identified in some other way, for instance via a URI at which it can be retrieved.

One or more worker response messages are received from the one or more workers at 710. In some embodiments, the worker response messages may include one or more results determined by executing the model against the data.

A result is determined at 712 based on the one or more result messages. In some embodiments, the result may be simply parsed from the response message. Alternatively, the result may be determined by combining different results obtained by different workers into a single result to be sent to the client machine. The result is then transmitted to the client machine in a result message at 714.

Figure 8:
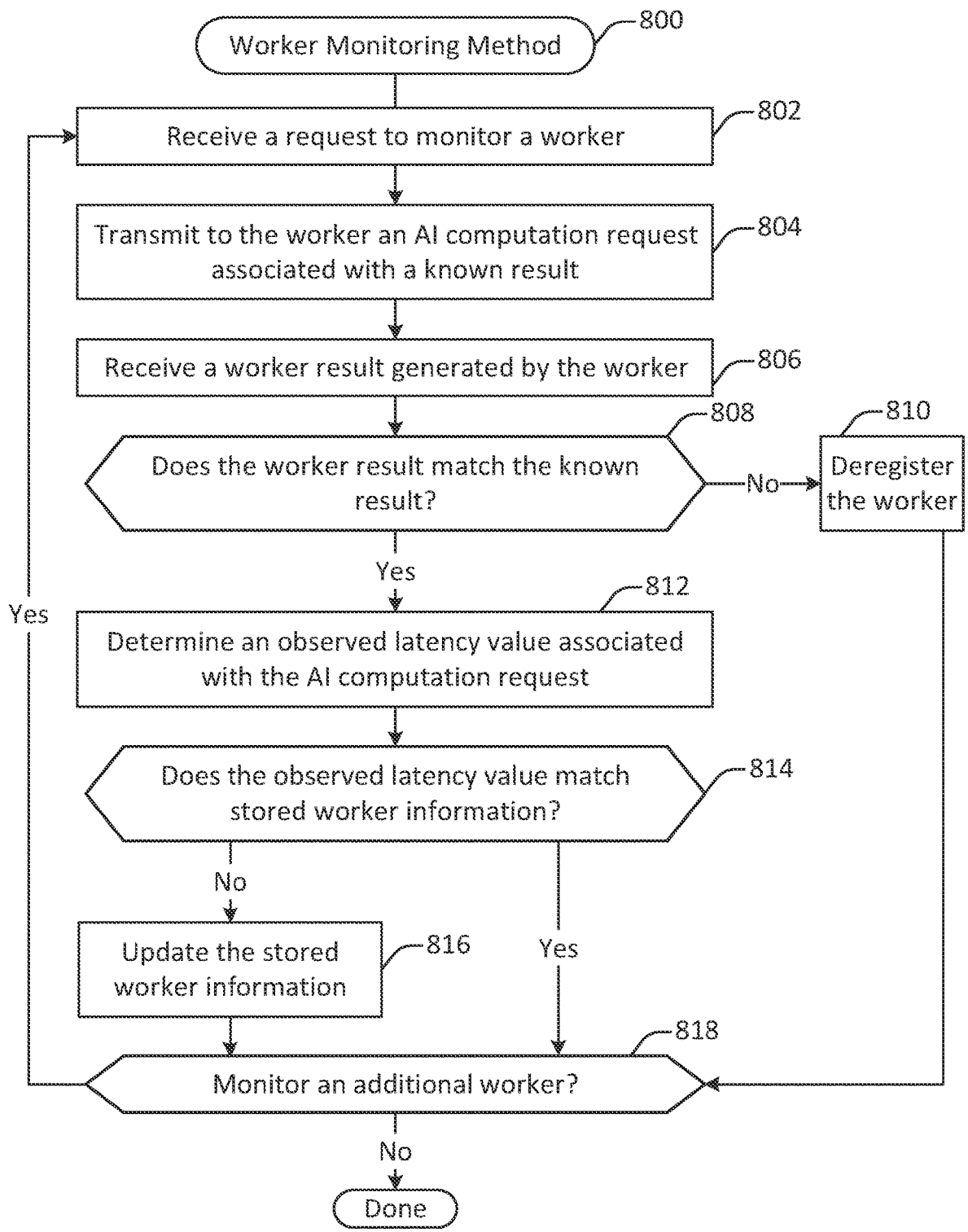
FIG. 8 illustrates a worker monitoring method, performed in accordance with one or more embodiments.

FIG. 8 illustrates a worker monitoring method 800, performed in accordance with one or more embodiments. In some embodiments, the method 800 may be performed by the artificial intelligence computation gateway 110 shown in FIG. 1.

A request to monitor a worker is received at 802. In some embodiments, the request may be generated periodically or at random for each worker. Alternatively, or additionally, one or more of the operations shown in FIG. 8 may be performed in the process of executing actual computation requests. For instance, the same computation request may be sent to multiple workers, and the results compared to determine whether each worker is properly executing the computation requests.

An AI computation request associated with a known result is transmitted to a worker at 804, and a result generated by the worker is received at 806. In some embodiments, operations 804 and 806 may be similar to or the same as operations discussed with respect to the method 700 shown in FIG. 7. In some embodiments, the result may be known because it has been precomputed using a trusted model. Alternatively, or additionally, the result may be known because the computation request is sent to multiple workers, with the known result being determined by consensus.

A determination is made at 808 as to whether the worker result matches the known result. If the two results do not match, then the worker may be operating either in error or maliciously, since the worker is returning a result different than the result known to obtain from executing the identified model on the identified data. Accordingly, the worker may be deregistered at 810.

If instead the worker result matches the known result, then an observed latency value associated with the AI computation request is determined at 812. In some embodiments, the latency value may represent a time between request transmission (or receipt) and result transmission (or receipt). A determination is made at 814 as to whether the observed latency value matches the worker information stored in the worker registry. If the data does not match, then the information stored in the worker registry may be updated at 816. For instance, the stored latency information may not reflect current network conditions or operating conditions associated with the worker.

A determination is made at 818 as to whether to monitor an additional worker. Additional workers may continue to be monitored until all workers identified for monitoring have been evaluated.

Figure 9:
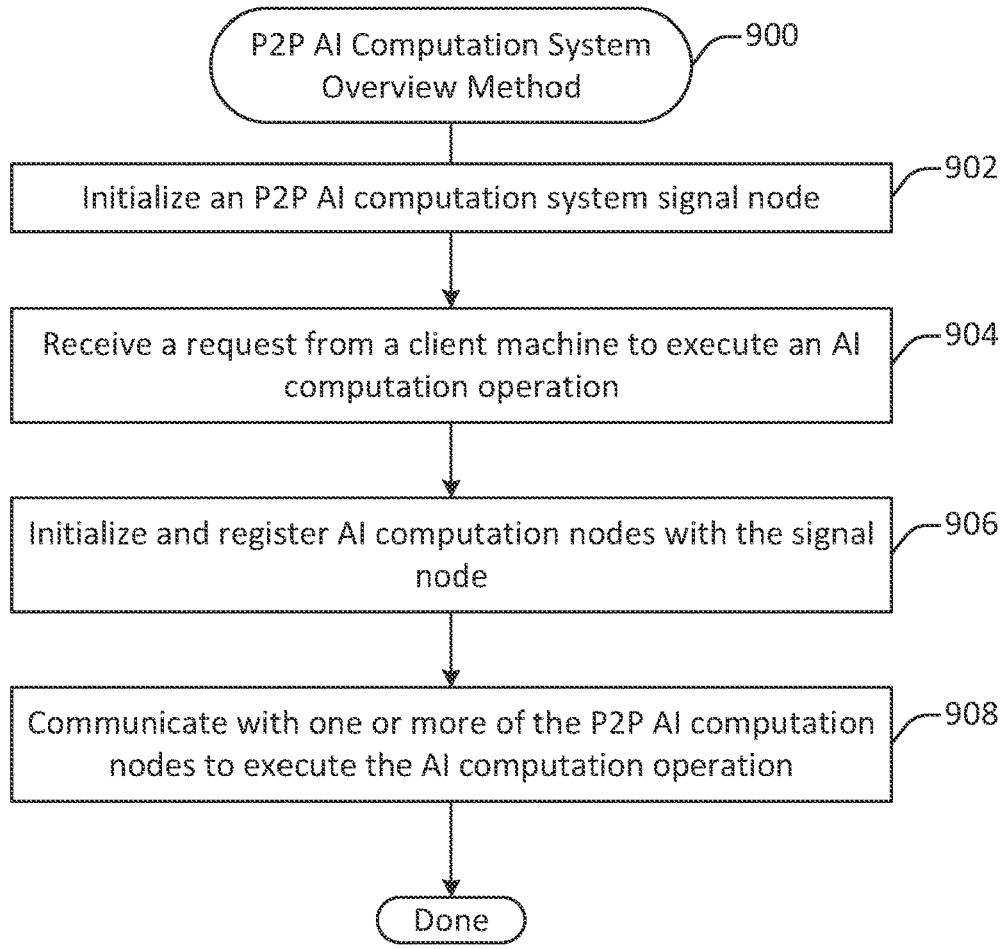
FIG. 9 illustrates an overview method for operating a P2P AI network system, performed in accordance with one or more embodiments.

FIG. 9 illustrates an overview method 900 for operating a P2P AI network system, performed in accordance with one or more embodiments. According to various embodiments, the method 900 may be performed at one or more components of the P2P AI network system 190 shown in FIG. 2, such as the signal node 210.

An AI signal node is initialized at 902. In some embodiments, initializing the AI signal node may involve operations such as establishing connections to AI computation nodes. In addition, an API for communicating with client machines may be exposed via a communication interface. Additional details regarding AI signal node initialization are discussed with respect to the method 1000 shown in FIG. 10.

AI computation nodes are initialized and registered with the signal node at 906. According to various embodiments, initializing and registering AI computation nodes may involve one or more operations such as downloading models to the AI computation nodes and verifying the downloaded models via communication with the signal node. Additional details regarding the initialization and registration of AI computation nodes are discussed with respect to the methods 1100 and 1200 shown in FIG. 11 and FIG. 12.

A request to execute an AI computation operation is received from a client machine at 906. In some embodiments, the request may identify a model and inference data on which to execute the model. Alternatively, the request may identify a model and fine-tuning data on which to fine-tune the model.

At 908, the AI computation gateway communicates with one or more of the AI computation workers to execute the request. Executing the request may involve operations such as identifying one or more criteria for selecting a P2P computation node, selecting one or more P2P computation nodes based on the criteria, and transmitting one or more instructions to the selected P2P computation node or nodes.

In addition to the operations shown in FIG. 9, AI computation nodes may be monitored via techniques that are the same as or similar to those discussed with respect to the method 800 in FIG. 8. Alternatively, or additionally, an AI computation node that has already been registered may be periodically subjected to registration operations of the type discussed with respect to FIG. 12, for instance to update and/or verify that the information determined at registration remains accurate.

Figure 10:
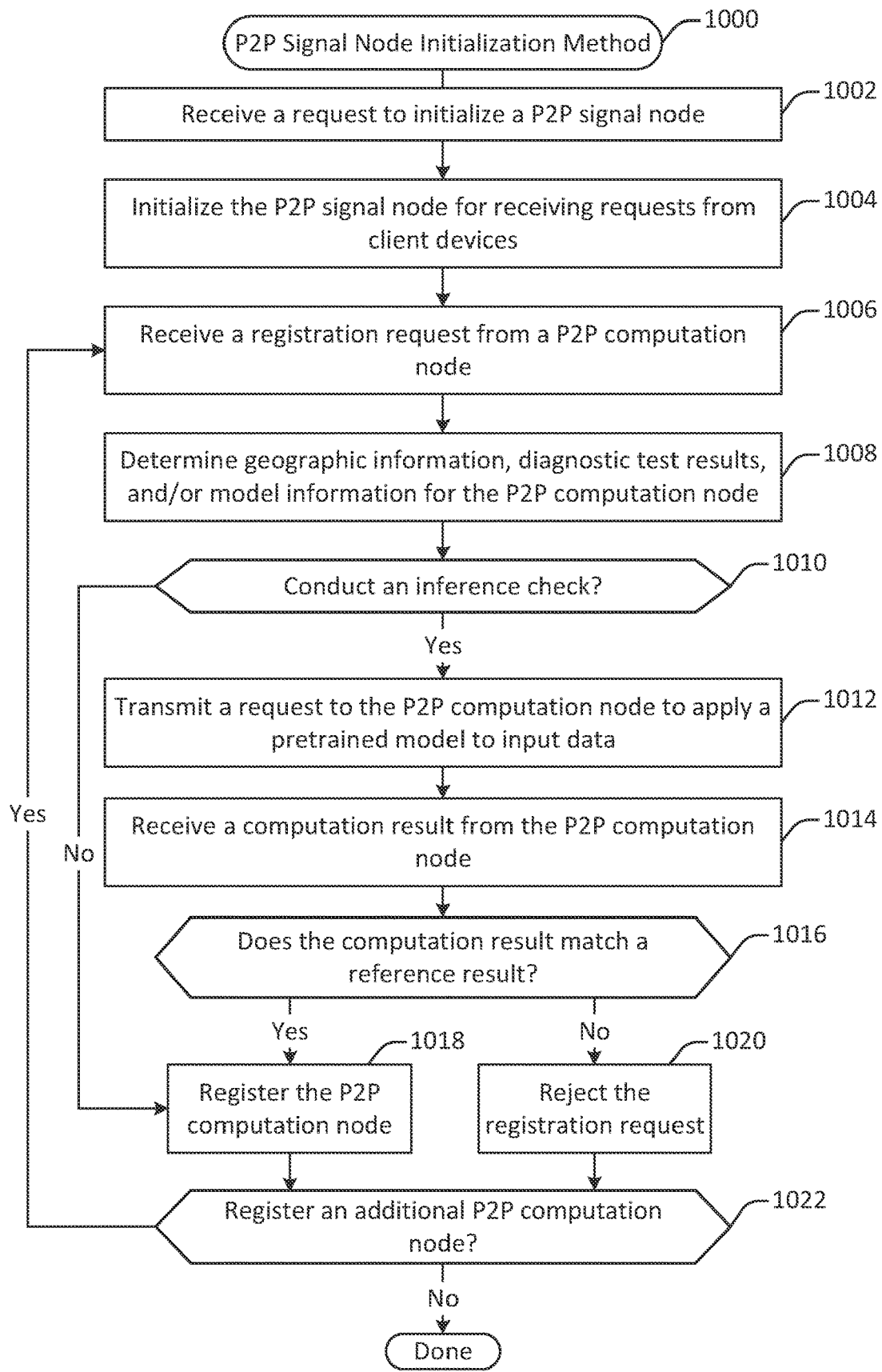
FIG. 10 illustrates a method for initializing a signal node, performed in accordance with one or more embodiments.

FIG. 10 illustrates a method 1000 for initializing a signal node, performed in accordance with one or more embodiments. According to various embodiments, the method 1000 may be performed at the signal node 210 shown in FIG. 2.

A request to initialize a P2P signal node is received at 1002. In some embodiments, the request may be generated based on any of a variety of triggering conditions. For instance, an automated script, a request from a remote device, user input, or some other condition may trigger the initialization of the AI computation gateway.

At 1004, the P2P signal node is initialized for receiving requests from client devices. According to various embodiments, initializing the P2P signal node may involve, for instance, exposing an API for receiving requests via a communication interface.

A registration request from a P2P computation node is received at 1006. In some embodiments, the request may be generated as is discussed in greater detail with respect to the methods 1000 and 1100 shown in FIG. 10 and FIG. 11.

Geographic information, diagnostic test results, and/or model information for the P2P computation node are determined at 1008. According to various embodiments, the geographic information may identify a geographic location or region in which the P2P computation node is located. The diagnostic test results may indicate proper functioning and/or capabilities of the P2P computation node. The model information may identify one or more models accessible for execution at the P2P computation node.

In some embodiments, such information may be included with the request. Alternatively, or additionally, some such information may be determined dynamically (e.g., based on IP address) or by communication between the signal node and the P2P computation node after establishing a communication session.

A determination is made at 1010 as to whether to conduct an inference check. In some embodiments, the determination may be made based at least in part on a random number generator. Alternatively, or additionally, the determination may be made based on one or more deterministic criteria. For example, an inference check may be conducted periodically, when a P2P computation node is first registered with the P2P signal node, and/or when a change is detected in the P2P computation node.

Upon determining that an inference check is to be conducted, at 1012 a request is transmitted to the P2P computation node to apply a pretrained model to input data. For instance, the request may identify an inference computation on data for which the result is known in advance to the signal node. Information about such verification requests may be stored at the signal node and selected, for example at random, when an inference check is to be conducted. The model may be selected based on the model information identifying models available for execution at the P2P computation node.

A result is received from the P2P computation node at 1014. A determination is then made at 1016 as to whether the computation result matches a predetermined reference result known to the P2P signal node.

Upon determining that the computation result matches the reference result, the P2P computation node is registered at 1018. In some embodiments, registering the P2P computation node may involve operations such as storing information about the P2P computation node in a P2P computation node registry at the P2P signal node. Also, a response message notifying the P2P computation node of successful registration may be sent.

Upon determining instead that the computation result does not match the reference result, the registration request is rejected at 1020. Rejecting the registration request may involve, for example, transmitting a registration rejection message to the P2P computation node. Also, a record reflecting the unsuccessful registration request may be stored at the P2P signal node.

A determination is made at 1022 as to whether to register an additional P2P computation node. According to various embodiments, additional P2P computation nodes may continue to be registered as long as the P2P signal node is active and available. For instance, a P2P signal node of a plurality of P2P signal nodes in a distributed system may have a maximum number of P2P computation nodes that may be registered at the P2P signal node.

Figure 11:
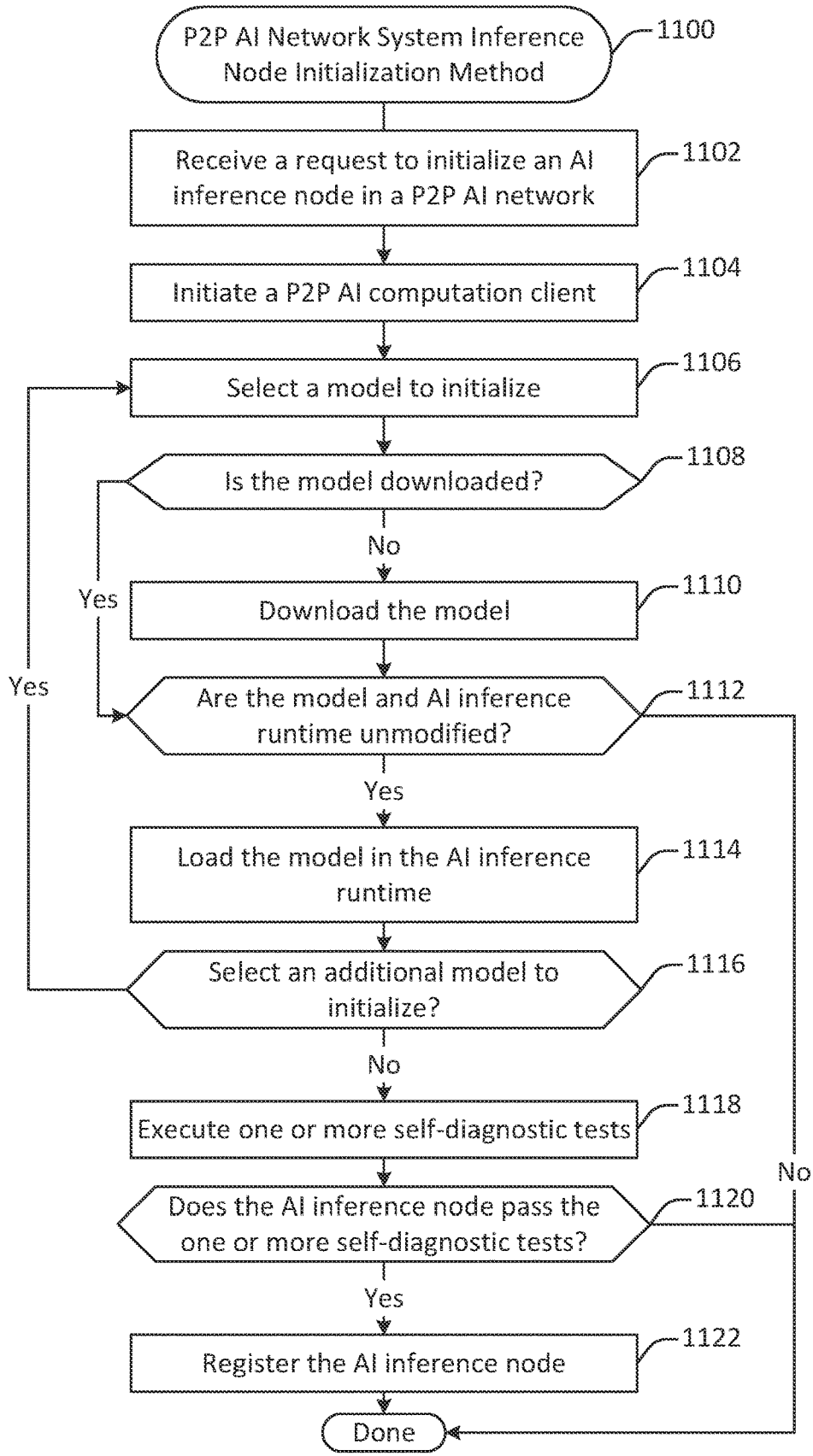
FIG. 11 illustrates a method for initializing a P2P AI network system computation node, performed in accordance with one or more embodiments.

FIG. 11 illustrates a method 1100 for initializing a P2P AI network system computation node, performed in accordance with one or more embodiments. The method 1100 may be performed at any suitable computing device, such as the P2P computation node 220 shown in FIG. 2.

A request to initialize an AI computation node is received at 1102. In some embodiments, the request may be generated when the AI computation node is activated. For instance, an automated script, a request from a remote device, user input, or some other condition may trigger the initialization of the AI computation node.

A P2P AI computation node client is initiated at 1104. In some embodiments, the P2P AI worker program may be a client facilitating interactions between the AI computation node and the rest of the P2P AI computation network system.

A model to initialize is selected at 1106. In some embodiments, the model may be a particular trained version of an AI model, as discussed herein. The model may be identified based on one or more configuration parameters, request messages, user input instructions, or the like.

A determination is made at 1108 as to whether the model is downloaded. A downloaded model may be stored in memory or in a storage device at the P2P computation node. Upon determining that the model is not downloaded, the model is downloaded at 1110. Downloading the model may involve retrieving it from a storage repository such as a network accessible location on a remote computing device and storing it on the P2P computation node.

A determination is made at 1112 as to whether the model and AI computation runtime are unmodified. In some embodiments, the determination may be made at least in part by computing hash values for all or a portion of the model and the AI computation runtime. Upon determining that the model and AI computation runtime are unmodified, the model is loaded in the AI computation runtime at 1114.

A determination is made at 1116 as to whether to select an additional model to initialize. In some embodiments, additional models may be selected for initialization, in sequence or in parallel, until all models identified for loading have been loaded.

Upon determining not to initialize an additional P2P computation node, one or more self-diagnostic tests are executed at 1118. In some embodiments, a self-diagnostic test may involve executing a model using predetermined input to identify whether the output produced by the model is the same as predetermined expected output.

Upon determining that the AI computation node passes the one or more self-diagnostic tests, the AI computation node is registered at 1122. Additional details regarding P2P computation node registration are discussed with respect to the method 1200 shown in FIG. 12.

Figure 12:
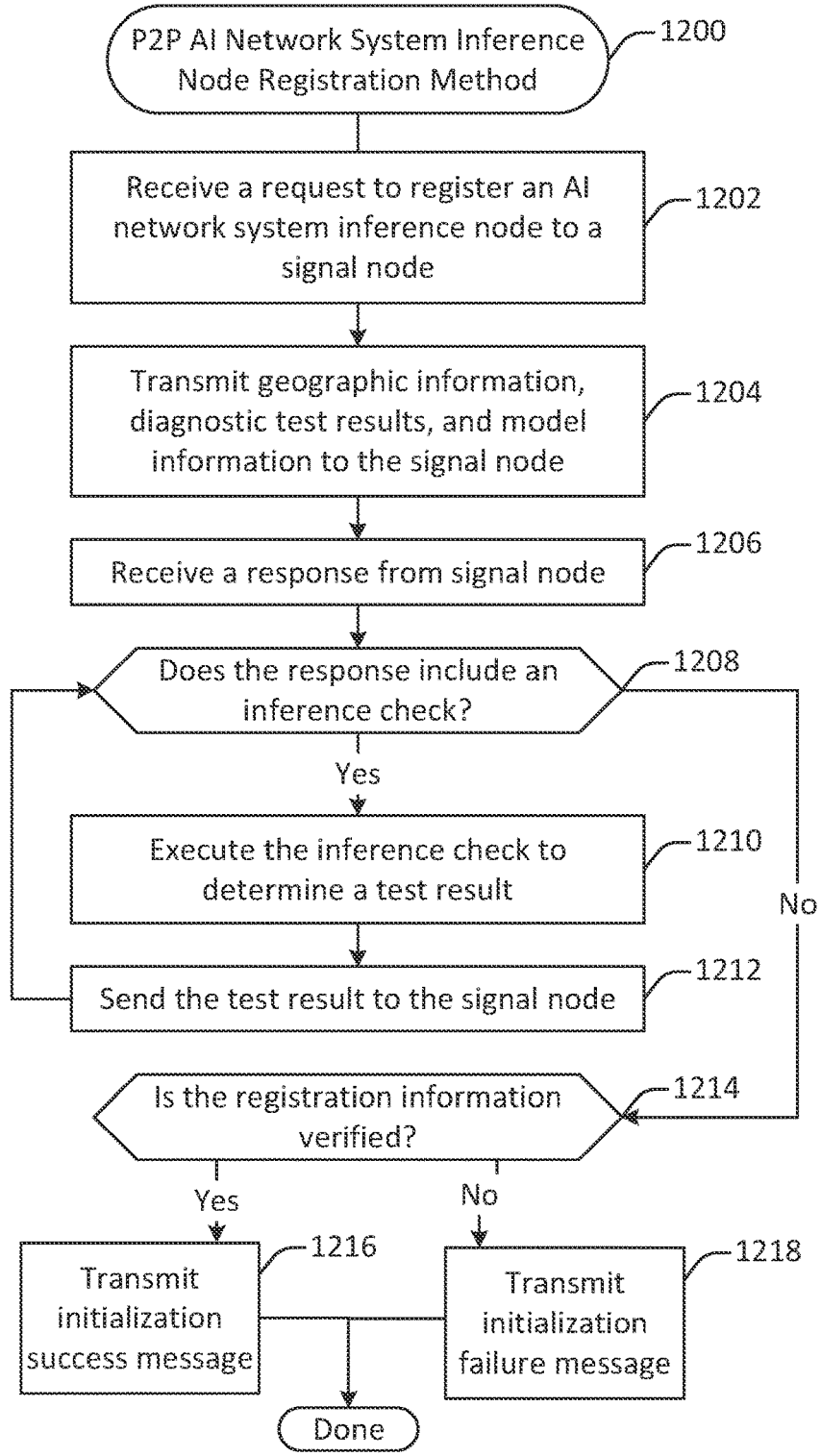
FIG. 12 illustrates a method for registering a P2P network system computation node at a signal node, performed in accordance with one or more embodiments.

FIG. 12 illustrates a method 1200 for registering a P2P computation node at a signal node, performed in accordance with one or more embodiments. It may be executed at the signal node 210 shown in FIG. 2.

At 1202, a request to register a P2P computation node to a signal node is received. In some implementations, the request may be generated as discussed with respect to the method 1000 shown in FIG. 10.

Geographic information, diagnostic test results, and model information are transmitted to the signal node at 1204. According to various embodiments, the diagnostic test results may include information such as latency for performing computation tasks with one or more models at the P2P computation node.

A response message from the signal node is received at 1206. A determination is made at 1208 as to whether the response message includes an inference check. An inference check may identify, for instance, a model to execute and data on which to execute the model.

Upon determining that the response includes an inference check, the inference check is executed to determine a test result at 1210, and a response message including the test result is sent to the signal node at 1212. In some embodiments, the test result may be determined by executing the requested model on the identified test data, for instance as discussed with respect to the methods 1300 and 1400 shown in FIG. 13 and FIG. 14.

Upon determining that the response does not include an inference check, at 1214 a determination is made as to whether the registration information was verified by the signal node. Upon determining that the registration information was verified, an initialization success message is transmitted at 1216. Upon determining instead that the registration information was not verified, an initialization failure message is transmitted at 1218. Such messages may be sent to, for instance, whichever user, program, or remote computing device requested the initialization of the inference node.

Figure 13:
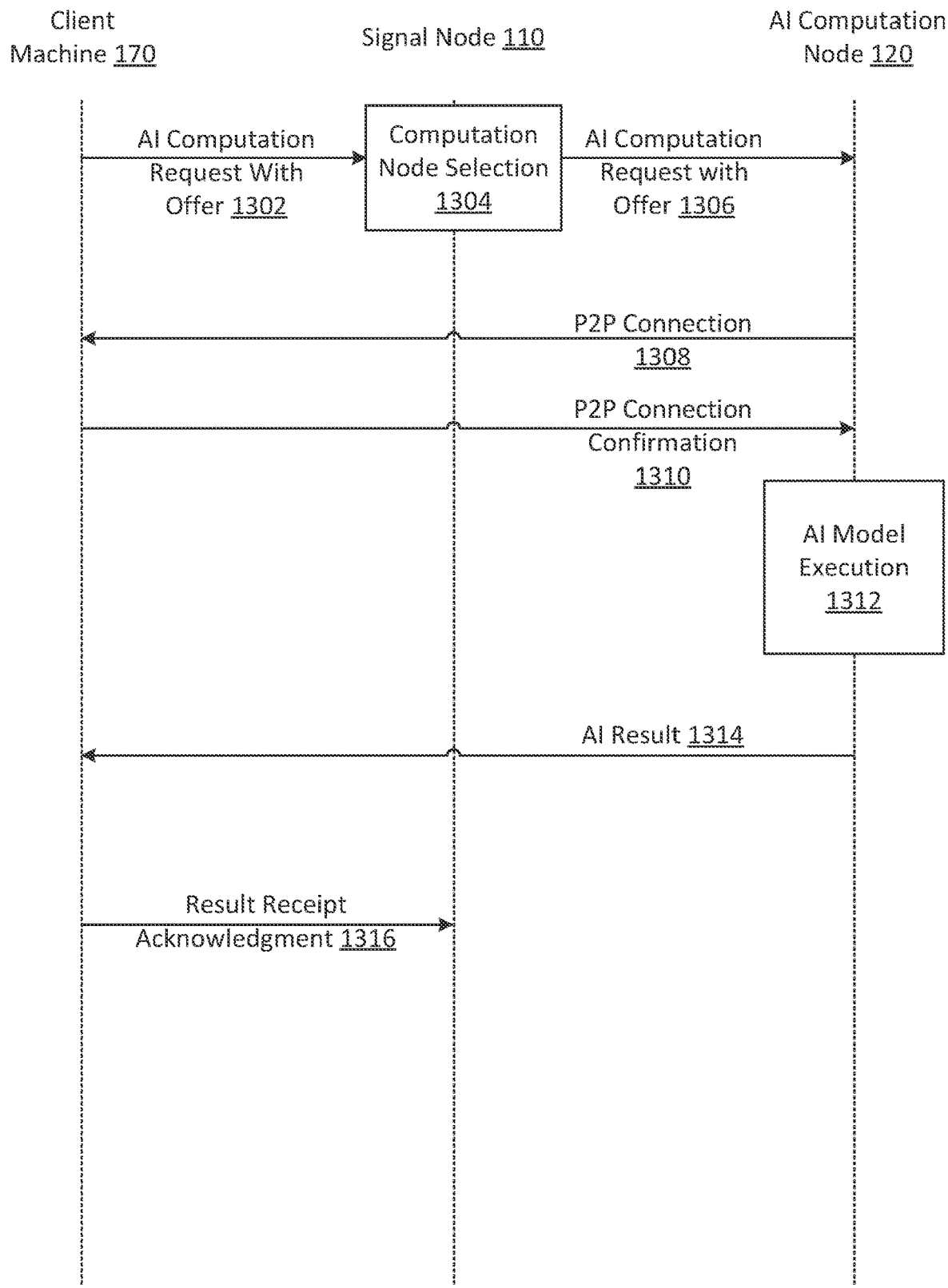
FIG. 13 illustrates an AI computation API call execution method, performed in accordance with one or more embodiments.

FIG. 13 illustrates an AI computation API call execution method 1190, performed in accordance with one or more embodiments. In some embodiments, the method 1190 may be performed at the system 190 shown in FIG. 2.

At 1302, an AI computation request is sent from a client machine 270 to an AI signal node 210. The AI computation request may identify information such as a model to execute, data on which to execute the model, acceptable latency information, acceptable cost information, and the like. The AI computation request may be sent via an API supported by the AI computation system 190.

An example of an AI computation request is as follows. In the following request, the API gateway is contacted with an API token and information specifying a model to employ, in this case an image generation model (i.e., "SDXL" version 1.0). The API request also specifies an output image to generate and data used to generate the result (i.e., a height, width, and prompt for generating the image).

```
// init p2p AI computation client with signal node
client = P2PClient(sinal_node="https://signal_node.hippoml.com", client_id=xxxxx)
// send AI computation request, and async wait for results from P2P communication
let output = await client.request({
  "model" : "sdxl",
  "version" : "1.0",
  "height": 1024,
  "width": 1024,
  "prompt": "Astronaut on Mars",})
```

The AI computation request may include an offer. The offer may identify connection information for the client machine 270. For instance, the offer may include information such as an IP address, an authentication token, and the like.

At 1304, the signal node 210 selects a P2P computation node. According to various embodiments, the P2P computation node may be selected based on information such as cost, latency, model availability, and geographic proximity.

An AI computation request may be sent to the selected AI computation node 220 at 1306. The AI computation request may include the offer. The AI computation request may be sent via the API supported by the AI computation system 190.

The AI computation node 220 establishes a P2P connection with the client machine at 170 based on the information included in the offer. The connection is confirmed at 1310.

The AI computation node also executes the AI model in accordance with the computation request at 1312. The result of the AI model execution is communicated to the client machine at 1314, and the client acknowledges receipt of the AI result to the signal node at 1316.

Although the P2P connection and connection confirmation messages are shown in FIG. 13 as occurring before the execution of the AI model at 1312, the operations may be performed in an order different than that shown. For example, one or both of these connection operations may be performed during or after the execution of the AI model at 1312.

Figure 14:
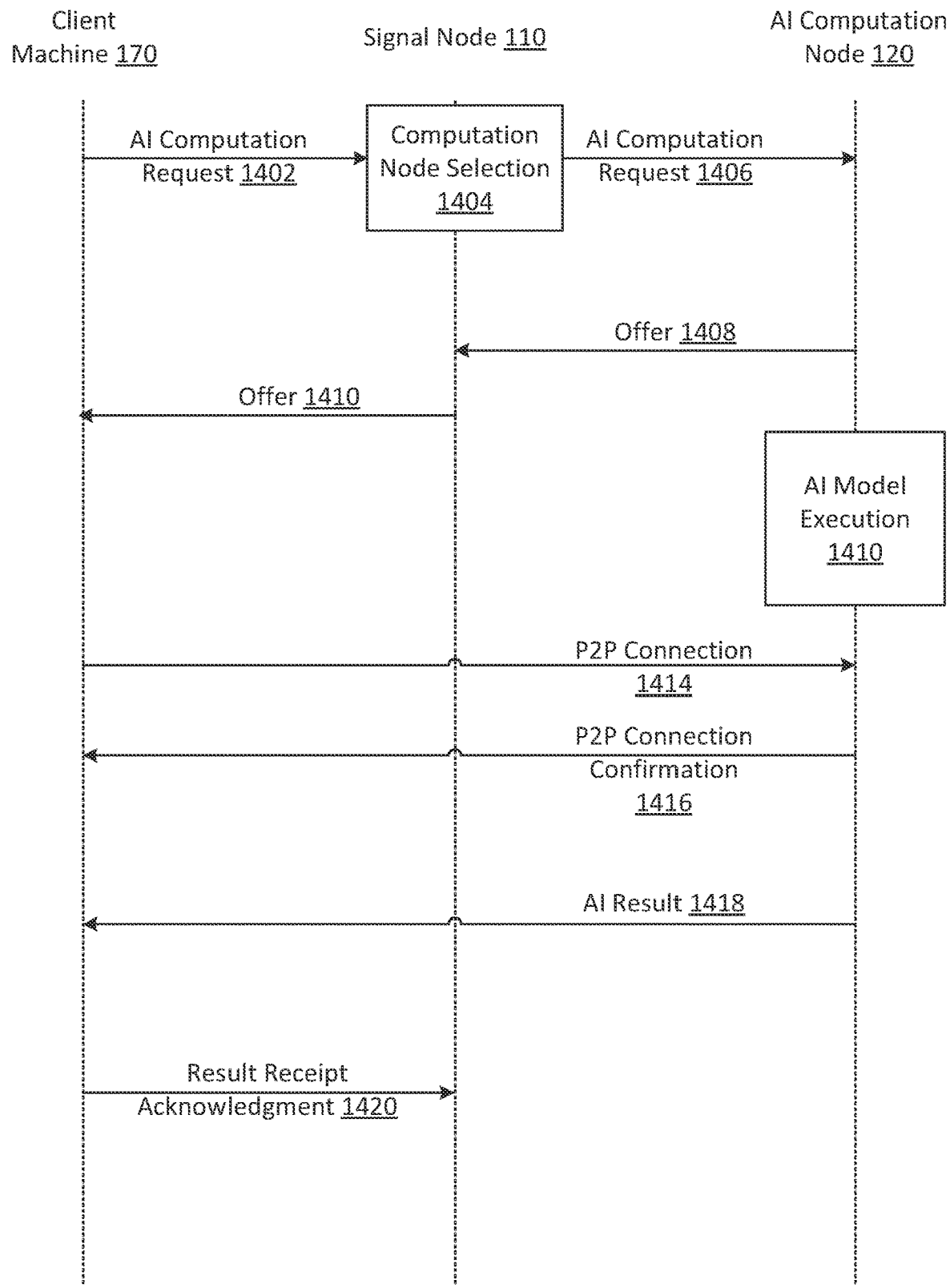
FIG. 14 illustrates an alternative AI computation API call execution method, performed in accordance with one or more embodiments.

FIG. 14 illustrates an alternative AI computation API call execution method 1400, performed in accordance with one or more embodiments. In some embodiments, the method 1400 may be performed at the system 100 shown in FIG. 1. The method 1400 represents an alternative flow to that shown in FIG. 5.

At 1402, an AI computation request is sent from a client machine 270 to an AI signal node 210. The AI computation request may identify information such as a model to execute, data on which to execute the model, acceptable latency information, acceptable cost information, and the like. The AI computation request may be sent via an API supported by the AI computation system 190.

At 1404, the signal node 210 selects a P2P computation node. According to various embodiments, the P2P computation node may be selected based on information such as cost, latency, model availability, and geographic proximity.

An AI computation request may be sent to the selected AI computation node 220 at 1406. The AI computation request may be sent via the API supported by the AI computation system 190.

The AI computation node sends an offer to the signal node 210 at 1408, and the signal node 110 sends the offer to the client machine 270 at 1410. The offer may identify connection information for the AI computation node 220. For instance, the offer may include information such as an IP address, an authentication token, and the like.

The client machine uses the offer to establish a P2P connection with the AI computation node at 1414 and 1416 based on the information included in the offer.

The AI computation node also executes the AI model in accordance with the computation request at 1410. The result of the AI model execution is communicated to the client machine at 1418, and the client acknowledges receipt of the AI result to the signal node at 1420.

Although the P2P connection and connection confirmation messages are shown in FIG. 14 as occurring after the execution of the AI model at 1410 and although the offer is shown as being sent before the execution of the AI model at 1410, the operations may be performed in an order different than that shown. For instance, the AI model execution 1410 may be performed in parallel with, before, or after these operations.

In particular embodiments, the signal node 110 may facilitate the establishment of a network tunnel from the API gateway directly to an AI computation node. In this way, the API gateway may skip the signal node when transmitting a computation request to an AI computation node.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of P2P AI computation networks. However, the techniques disclosed herein apply to a wide variety of computing environments, such as self-hosted AI computation systems. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A peer-to-peer signal node comprising:
one or more processors to:
receive, from a client machine of one or more of client machines, a client request message identifying a computing model and including input data to be executed using the computing model;
obtain a node registry that associates distributed computation nodes with one or more computing models available for execution at the distributed computation nodes, a first distributed computation node of the distributed computation nodes acting as a first gateway to a first artificial intelligence service and a second distributed computation node of the distributed computation nodes acting as a second gateway a second artificial intelligence service;
select, using the node registry, the first distributed computation node based at least on the computing model being identified in the node registry as being executable at the first distributed computation node;
send, to the first distributed computation node, one or more computation request messages that identify the computing model and include the input data; and
based at least on the one or more request messages being sent, establish a communication session between the first distributed computation node and the client machine through which the first distributed computation node is able to send a result obtained based at least on executing the computing model using the input data.

2. The peer-to-peer signal node recited in claim 1, wherein the result is sent to the client machine without passing through the peer-to-peer signal node.

3. The peer-to-peer signal node recited in claim 1, wherein the establishing the communication session comprises sending an offer to the first distributed computation node, the offer including connection information to send an initial peer-to-peer connection message from the first distributed computation node to the client machine.

4. The peer-to-peer signal node recited in claim 1, wherein the establishing the communication session comprises sending an offer to the client machine, the offer including connection information to send an initial peer-to-peer connection message from the client machine to the first distributed computation node.

5. The peer-to-peer signal node recited in claim 1, wherein the one or more processors are further to:
determine a dynamic latency value based at least on timing of the computation request message and sending of the result; and
determine to deregister the first distributed computation node from the node registry based at least on a determination that the dynamic latency value is inconsistent with a registered latency value stored in the node registry.

6. The peer-to-peer signal node recited in claim 1, wherein the one or more processors are further to:
send a validation request identifying validation input data to the first distributed computation node;
receive a validation response including a validation output value; and
determine to deregister the first distributed computation node from the node registry based at least on a determination that the validation output value does not match a predetermined validation value determined by executing the computing model based at least on the validation input data.

7. The peer-to-peer signal node recited in claim 1, wherein the one or more processors are further to:
provide an application procedure interface (API) to the one or more client machines via a network,
wherein the client request message conforms to the API.

8. The peer-to-peer signal node recited in claim 1, wherein the client machine is an artificial intelligence (AI) computation worker of a plurality of AI computation workers in a distributed AI computation network.

9. The peer-to-peer signal node recited in claim 1, wherein the computing model includes at least one of a pretrained machine learning model or an artificial intelligence model.

10. The peer-to-peer signal node recited in claim 9, wherein:
the input data includes inference data;
the executing the computing model comprises applying the inference data to the at least one of the pretrained machine learning model or the artificial intelligence model; and the result includes an output value determined based at least on the at least one of the pretrained machine learning model or the artificial intelligence model processing the inference data.

11. The peer-to-peer signal node recited in claim 9, wherein:
the input data includes finetuning data; and
the executing the computing model comprises finetuning the at least one of the pretrained machine learning model or the artificial intelligence model based at least on the finetuning data.

12. The peer-to-peer signal node recited in claim 1, wherein:
the first distributed computation node is controlled by a first entity and the second distributed computation node is controlled by a second entity;
the client machine is controlled by a third entity; and
the peer-to-peer signal node is controlled by a fourth entity.

13. The peer-to-peer signal node recited in claim 1, wherein the one or more computing models includes the computing model provided by a first computing model provider and a second computing model provided by a second computing model provider.

14. The peer-to-peer signal node recited in claim 1, wherein the one or more processors are further to:
determine information associated with the first distributed computation node, the information including at least one of availability information, geographic location information, communication latency information, or computation cost information; and
storing the information in association with the first distributed computation node.

15. The peer-to-peer signal node recited in claim 1, wherein:
the first artificial intelligence service is located in a first cloud computing network associated with a first cloud computing provider; and
the second artificial intelligence service is located in a second cloud computing network associated with a second cloud computing provider.

16. The peer-to-peer signal node recited in claim 1, wherein the one or more processors are further to:
receive computing model information from a model storage system storing the one or more computing models, wherein the computing model is retrieved from the model storage system by the first distributed computation node.

17. A method comprising:
receiving a first request message from a client machine of one or more client machines in communication with a peer-to-peer signal node, the first request message identifying a computing model and input data on which to execute the computing model;
obtaining a node registry that associates distributed computation nodes with one or more computing models available for execution at the distributed computation nodes, a first distributed computation node of the distribute computation nodes acting as a first artificial intelligence service located in a first cloud computing network and a second distributed computation node of the distributed computation nodes acting as a second artificial intelligence service located in a second cloud computing network;
selecting, using the node registry, the first distributed computation node based at least on the computing model being executable at the first distributed computation node;
sending one or more second request messages to the first distributed computation node, the one or more second request messages identifying the computing model and the input data; and
based at least on the sending the one or more second request messages, establishing a communication session between the first distributed computation node and the client machine through which the first distributed computation node is able to send a result obtained based at least on executing the computing model using the input data.

18. The method recited in claim 17, wherein the establishing the communication session comprises sending an offer to the first distributed computation node, the offer including connection information to send an initial peer-to-peer connection message from the first distributed computation node to the client machine.

19. The method recited in claim 17, wherein the establishing the communication session comprises sending an offer to the client machine, the offer including connection information to send an initial peer-to-peer connection message from the client machine to the first distributed computation node.

20. One or more processors comprising:
processing circuitry to:
receive a first request message from a client machine of one or more client machines in communication with a peer-to-peer signal node, the first request message identifying a computing model and input data on which to execute the computing model;
obtain a node registry that associates distributed computation nodes with one or more computing models available for execution at the distributed computation nodes, a first distributed computation node of the distributed computation nodes located in a first cloud computing network associated with a first cloud computing provider and a second distributed computation node of the distributed computation nodes located in a second cloud computing network associated with a second cloud computing provider;
select, using the node registry, the first distributed computation node based at least on the computing model being identified as being executable at the first distributed computation node;
send one or more second request messages to the first distributed computation node, the one or more second request messages identifying the computing model and the input data; and
based at least on the one or more second request messages being sent, establish a communication session between the first distributed computation node and the client machine through which the first distributed computation node is able to send a result obtained based at least on executing the computing model using the input data.

* * * * *